United States Patent
Hashimoto et al.

(10) Patent No.: US 9,582,487 B2
(45) Date of Patent: Feb. 28, 2017

(54) PREDICATE TEMPLATE COLLECTING DEVICE, SPECIFIC PHRASE PAIR COLLECTING DEVICE AND COMPUTER PROGRAM THEREFOR

(71) Applicant: National Institute of Information and Communications Technology, Tokyo (JP)

(72) Inventors: Chikara Hashimoto, Tokyo (JP); Kentaro Torisawa, Tokyo (JP); Stijn De Saeger, Tokyo (JP); Jonghoon Oh, Tokyo (JP); Junichi Kazama, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 14/377,988

(22) PCT Filed: Jan. 23, 2013

(86) PCT No.: PCT/JP2013/051326
§ 371 (c)(1),
(2) Date: Aug. 11, 2014

(87) PCT Pub. No.: WO2013/128984
PCT Pub. Date: Sep. 6, 2013

(65) Prior Publication Data
US 2015/0039296 A1    Feb. 5, 2015

(30) Foreign Application Priority Data
Feb. 27, 2012    (JP) .................... 2012-039966

(51) Int. Cl.
*G06F 17/27*    (2006.01)

(52) U.S. Cl.
CPC .......... *G06F 17/27* (2013.01); *G06F 17/2775* (2013.01); *G06F 17/2785* (2013.01); *G06F 17/2795* (2013.01)

(58) Field of Classification Search
None
See application file for complete search history.

(56) References Cited

U.S. PATENT DOCUMENTS

2004/0254783 A1    12/2004  Isahara
2005/0234709 A1*   10/2005  Klavans .............. G06F 17/2735
                                                       704/10

(Continued)

FOREIGN PATENT DOCUMENTS

CN    1554058 A    12/2004
CN    1813252 A     8/2006

(Continued)

OTHER PUBLICATIONS

International Search report for corresponding International Application No. PCT/JP2013/051326 mailed Apr. 9, 2013.

(Continued)

*Primary Examiner* — Qian Yang
(74) *Attorney, Agent, or Firm* — Renner, Otto, Boisselle & Sklar, LLP

(57) ABSTRACT

A predicate template collector allowing efficient and automatic recognition of predicate templates is adapted to include: a noun pair collector 94 and a noun pair polarity determiner 98 for collecting noun pairs co-occurring with predicate template pairs and determining polarity of relation between nouns, using conjunctions and seed templates; a template pair collector 100, collecting template pairs co-occurring with noun pairs and determining, based on the relation of noun pairs co-occurring with the predicate template pairs and the conjunctions between predicate templates pairs, whether the polarity of excitatory class of predicate (Continued)

template pair is the same or not; a template network builder 106 building a template network connecting predicate templates based on the predicate template pairs and match/mismatch of excitatory class thereof; and a template excitation value calculator 112 calculating excitation value to be assigned to each node, using the excitation value of seed templates and the relation between each of the nodes in the network.

5 Claims, 10 Drawing Sheets

(56) References Cited

U.S. PATENT DOCUMENTS

| | | | | |
|---|---|---|---|---|
| 2005/0278164 | A1* | 12/2005 | Hudson | G06F 17/30684 704/4 |
| 2006/0095250 | A1* | 5/2006 | Chen | G06F 17/2705 704/9 |
| 2007/0035745 | A1 | 2/2007 | Izumi et al. | |
| 2008/0275694 | A1* | 11/2008 | Varone | G06F 17/2785 704/9 |
| 2009/0048823 | A1 | 2/2009 | Liu et al. | |
| 2010/0017391 | A1* | 1/2010 | Mizuguchi | G06Q 10/10 707/E17.014 |
| 2010/0275179 | A1 | 10/2010 | Mengusoglu et al. | |
| 2012/0245923 | A1* | 9/2012 | Brun | G06F 17/2735 704/9 |
| 2012/0245924 | A1* | 9/2012 | Brun | G06F 17/2765 704/9 |
| 2014/0025372 | A1* | 1/2014 | Tamura | G06F 17/2765 704/9 |

FOREIGN PATENT DOCUMENTS

| | | |
|---|---|---|
| CN | 101377770 A | 3/2009 |
| CN | 101872341 A | 10/2010 |

OTHER PUBLICATIONS

Roxana Girju. "Automatic Detection of Causal Relations for Question Answering." In Proceedings of ACL Workshop on Multilingual Summarization and Question Answering, pp. 76-83, 2003.

Inui Takashi, Inui Kentaro, and Yuji Matsumoto, "Extracting Causal Knowledge from Text, The Case of Resultative Connectives 'tame'", Information Processing Society of Japan, Special Interest Group of Natural Language Processing (NL-150-25), pp. 171-178, 2002.

Inui Takashi and Manabu Okumura. "Characteristics of In-text Causal Relations." Information Processing Society of Japan, Special Interest Group of Natural Language Processing (NL-167-12), pp. 81-88, 2005.

Saif Mohammad, Bonnie Dorr and Graeme Hirst. "Computing Word Pair Antonymy." In Proceedings of the 2008 Conference on Empirical Methods in Natural Language Processing, pp. 982-991, Honolulu, Oct. 2008.

James Pustejovsky, "The Generative Lexicon", MIT Press, 1995.

Kentaro Torisawa, "Automatically Acquiring Natural Language Expressions Representing Preparation and Utilization of an Object" Shizen Gengo Shori (Natural Language Processing) vol. 13(2), pp. 125-144, 2006.

Masaaki Tsuchida, Kentaro Torisawa, Stijn De Saeger, Jong Hoon Oh, Jun'ichi Kazama, Chikara Hashimoto and Hayato Ohwada. "Toward Finding Semantic Relations not Written in a Single Sentence: An Inference Method using Auto-Discovered Rules." In Proceedings of the 5th International Joint Conference on Natural Language Processing (IJCNLP 2011), pp. 902-910, Chiang Mai, Thailand, Nov. 2011.

Dekang Lin and Patrick Pantel. "Discovery of inference rules for question answering." Natural Language Engineering, 7(4):343-360. 2001.

Hiroya Takamura, Takashi Inui, and Manabu Okumura. "Extracting Semantic Orientations of Words using Spin Model." In Proceedings of the 43rd Annual Meeting of the ACL, pp. 133-140. 2005.

\* cited by examiner

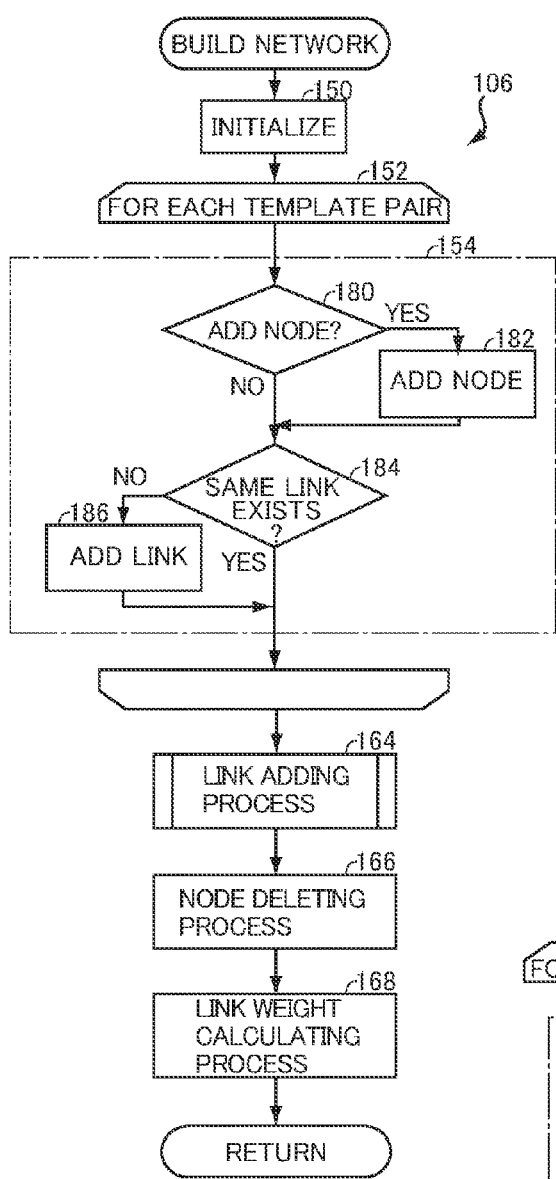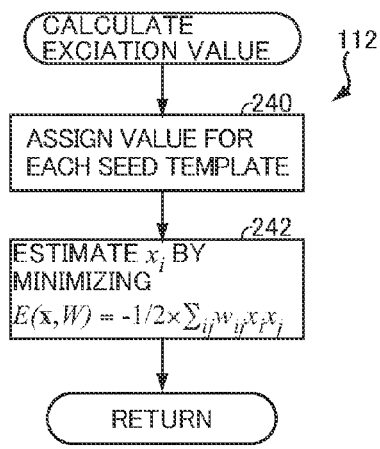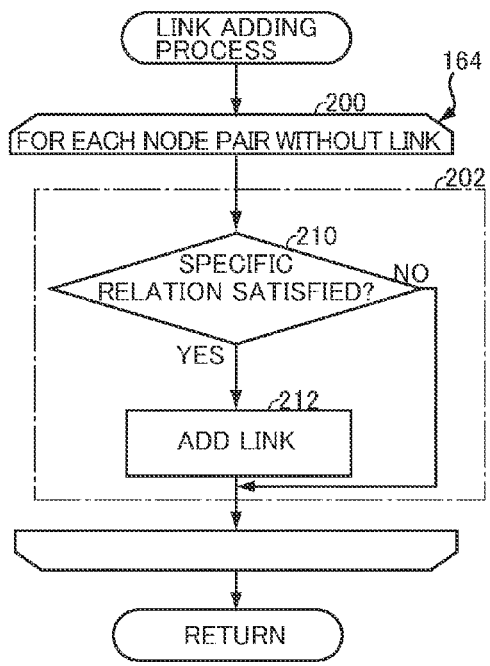

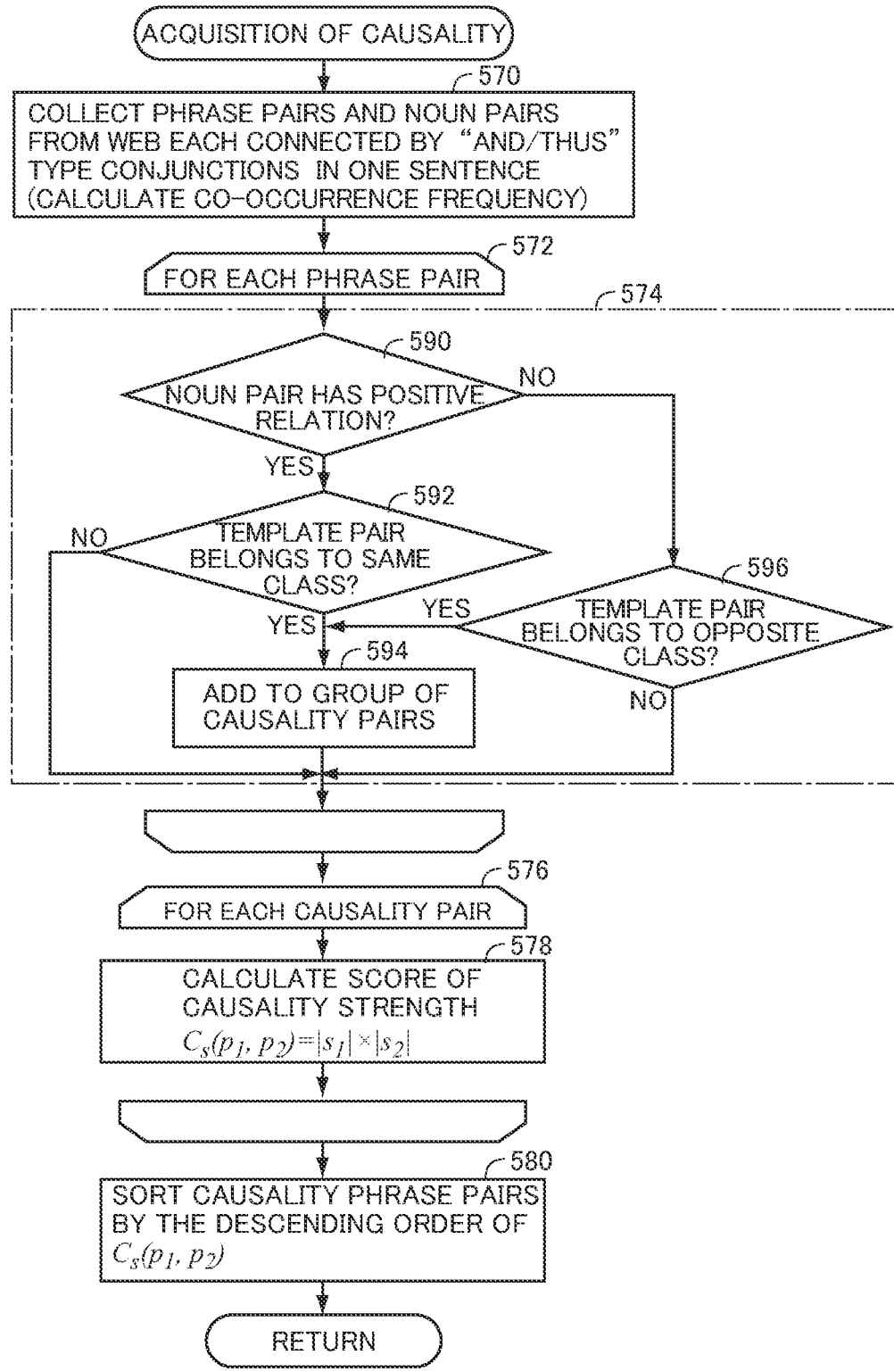

PREDICATE TEMPLATE COLLECTING DEVICE, SPECIFIC PHRASE PAIR COLLECTING DEVICE AND COMPUTER PROGRAM THEREFOR

TECHNICAL FIELD

The present invention relates to a technique for recognizing a relation between sentences or phrases of natural language and, more specifically, to a technique for automatically recognizing and collecting expressions related to causality, contradiction and the like between sentences or phrases.

BACKGROUND ART

With the advent of popular use of so-called search engines over the Internet, language processing techniques have been so advanced that considerably high level of services are being available for searching of "written information." In contrast, the techniques for inferring "unwritten but useful information" as a hypothesis are still insufficient. This type of technique may be the "technique to enable a system to consider" and it will be the core technique for information services of the next generation. Though such techniques have long been studied as a kind of "artificial intelligence" both in private and public sectors, practically or commercially usable level are yet to be achieved.

So-called sentences or phrases are basic elements for the language processing technique. (In the present specification, the language to be processes is Japanese language and a "phrase" refers to a noun and a predicate connected by a postpositional particle. When a language other than Japanese is to be processed, a unit equivalent to the "phrase" in Japanese is to be processed.) The sentences or phrases describe some piece of event or action in natural language. Between some sentences or phrases, we can sometimes find causality. For example, what is expressed by a phrase "tabako-wo-suu (smoke a cigarette)" is found to be a cause of what is expressed by the phrase "hai-gan ni kakaru (suffer from lung cancer)." We can also find a semantically contradictory relation between sentences or phrases, such as the relation between "seihin wo siyou suru (use a product)" and "seihin wo haki suru (scrap a product)."

Such relations between sentences or phrases can readily be recognized by humans. However, this will pose a challenge when it is to be processed by automated language processing. For instance, if the technical level is to be enhanced in conjunction with information service related to language, information analysis and language processing so that it is well integrated with higher functions such as inference, it is considered to be essential to have capabilities of highly accurate recognition of the above-described relations between sentences or phrases. Up to the present date, however, no technique has succeeded to find the above-described relations with high accuracy from a full spectrum of language expressions.

Non-Patent Literatures 1 to 7 listed below describe prior art related to elements and components of such a technique.

(A) A Scheme for Automatically Recognizing Causality Between Phrases

Non-Patent Literature 1 describes a technique for obtaining unknown causality through machine learning from among a huge amount of manually prepared causality examples. Examples in Japanese include automatic recognition of relations between phrases using occurrence of conjunctions such as "tame (since)" and "node (hence)" explicitly expressing causality in texts as clues (Non-Patent Literature 2).

(B) A Scheme for Automatically Recognizing Contradiction Between Phrases

A scheme using manually prepared dictionary such as WordNet is available (Non-Patent Literature 3).

(C) A Scheme for Classifying Verbs

Researchers have been trying to classify verbs based on whether a verb in a noun-verb combination describes an event that enhances or stimulates a function or effect or the like of the object indicated by the noun, or to automatically acquire verbs having such nature (for example, Non-Patent Literatures 4 and 5).

(D) A Scheme for Generating Hypothesis Based on Language

A technique of generating a hypothesis in relation to a specific semantic relation, e.g. causality, between words has been known (Non-Patent Literature 6). By way of example, "cholesterol" and "arterial sclerosis" has a causal connection, and if causal connection between "arterial sclerosis" and "cerebral infarction" is recorded in a database, these causal connections are combined and a new hypothesis that "cholesterol" is a cause of "cerebral infarction" is inferred.

(E) A Scheme for Automatically Recognizing Synonyms and Entailments Between Phrases Conventionally, regarding recognition of synonymity or entailments between words such as verbs, or between patterns such as "A causes B", a technique has been known in which probability distribution of words occurring near a word of interest or occurring at slots occupied by variables such as A or B in patterns is calculated, and statistical similarity (referred to as "distributional similarity") among them is utilized (Non-Patent Literature 7). For example, a pattern "A causes B" is recognized as substantially synonymous to "A is a cause of B." According to this technique, such synonymity is acquired by finding the frequencies of occurrence of a series of nouns such as "dioxin" and "cancer" that appear at the slots of A and B, and then utilizing the similarity of their occurrence probabilities distribution.

CITATION LIST

Non Patent Literature

NPL 1: Roxana Girju. "Automatic Detection of Causal Relations for Question Answering." In Proceedings of ACL Workshop on Multilingual Summarization and Question Answering. 2003. (A technique of acquiring a new causality by machine learning from manually prepared huge amount of causality examples.)

NPL 2: INUI Takashi, INUI Kentaro, and Yuji MATSUMOTO, "Extracting Causal Knowledge from Text, The Case of Resultative Connectives 'tame'", Information Processing Society of Japan, Special Interest Group of Natural Language Processing (NL-150-25), pp. 171-178, 2002. (Automatic recognition of causality between phrases. A technique for acquiring causality using specific connectives such as "tame" as clues.)

NPL 3: Saif Mohammad, Bonnie Dorr and Graeme Hirst. "Computing Word Pair Antonymy." In Proceedings of the 2008 Conference on Empirical Methods in Natural Language Processing, pp. 982-991, Honolulu, October 2008. (Automatic recognition of contradictions. A technique based on manually built dictionary.)

NPL 4: James Pustejovsky, "The Generative Lexicon", MIT Press, 1995. (Verb classification scheme.)

NPL 5: Kentaro Torisawa, "Automatically Acquiring Natural Language Expressions Representing Preparation and Utilization of an Object" Shizen Gengo Shori (Natural Language Processing) vol. 13(2), pp. 125-144, 2006. (A scheme for automatically acquiring verb classification.)

NPL 6: Masaaki Tsuchida, Kentaro Torisawa, Stijn De Saeger, Jong Hoon Oh, Jun'ichi Kazama, Chikara Hashimoto and Hayato Ohwada. "Toward Finding Semantic Relations not Written in a Single Sentence: An Inference Method using Auto-Discovered Rules." In Proceedings of the 5th International Joint Conference on Natural Language Processing (IJCNLP 2011), pp. 902-910, Chiang Mai, Thailand, November, 2011. (Generation of hypotheses based on language)

NPL 7: Dekang Lin and Patrick Pantel. "Discovery of inference rules for question answering." Natural Language Engineering, 7(4):343-360. 2001. (A scheme for automatically recognizing synonyms and entailments between phrases)

NPL 8: Hiroya Takamura, Takashi Inui, and Manabu Okumura. "Extracting Semantic Orientations of Words using Spin Model." In Proceedings of the 43$^{rd}$ Annual Meeting of the ACL, pp. 133-140. 2005. (A scheme for automatically calculating polarity values)

SUMMARY OF INVENTION

Technical Problem

[Where the Problems Exist]

In the following, problems unsolved by the prior art will be summarized with regard to five aspects: (A) The scheme for automatically recognizing causality between phrases; (B) The scheme for automatically recognizing contradiction between phrases; (C) The scheme for automatically classifying predicate templates (post-particle and verb pairs, example; <wo, taberu> (eat sth.)); (D) The scheme for automatically generating hypotheses based on language; and (E) The scheme for automatically recognizing synonyms and entailments between phrases.

(A) The Scheme for Automatically Recognizing Causality Between Phrases

Causality is one of the logical relations between phrases. According to the prior art, the causality is recognized using conjunctions such as "tame (since)" and "node (hence)" explicitly indicating the causality, or using a manually built dictionary as a source of information. The frequency of occurrence of conjunctions such as "tame (since)" is not very high, and the manually prepared dictionary covers only a limited number of words. Therefore, causalities that can be acquired are not large in number. Wider scope of application is desirable.

(B) The Scheme for Automatically Recognizing Contradiction Between Phrases

Contradiction between phrases is another example of the logical relations between phrases. Here, contradiction means that meanings of two phrases are opposite. Prior art directed to this aspect depends on manually built dictionary. Entries of such a dictionary are limited and, therefore, wide variety of expressions cannot be handled.

(C) The Scheme for Automatically Classifying Predicate Templates

The prior art focuses only on such verbs that describe events enhancing or stimulating a function, effect or the like of the object indicated by a noun. Attention simply to such nature of verbs is insufficient to successfully recognize contradiction/causality.

(D) The Scheme for Automatically Generating Hypothesis Based on Language

The technique disclosed in the prior art allows extraction of causality between words. Extraction of causality on the basis of wider unit, or generation of a hypothesis based on the causality, however, are impossible.

(E) The Scheme for Automatically Recognizing Synonyms and Entailments Between Phrases According to the prior art, probability distributions of other words occurring around a word, a phrase or a pattern are calculated, and then, similarities among probability distributions of these are calculated. Based on the thus obtained information, synonymity or entailment relation between words, phrases and patterns is recognized. Such a technique, however, has high possibility of erroneously recognizing "antonym" expressions as synonyms. This will be readily understood if we compare a pattern "A causes B" and a pattern "A prevents B." In these patterns, "cause" and "prevent" have opposite meanings. Probability distributions of other words appearing around these words, however, are highly similar. By way of example, ambiguous expressions such as "diets cause adult disease" and "diets prevent disease" frequently appearing in the compared patterns may be the cause of erroneous recognition. Because of high frequency of occurrence of such patterns, probability distributions of nouns occurring in the patterns including the words "cause" and "prevent" become similar. Therefore, it is necessary to enhance the ability to recognize synonymity and entailments with higher accuracy.

Therefore, an object of the present invention is to provide, in order to enable automatic recognition of logical relations between phrases such as causality and contradiction, a predicate template collecting device capable of efficiently, automatically and highly accurately recognizing predicate templates constituting the phrases.

Another object of the present invention is to provide a device capable of automatically, efficiently and highly accurately recognizing a phrase pair having a specific relation such as causality or contradiction.

Solution to Problem

According to the first aspect, the present invention provides a predicate template collecting device for collecting predicate templates from a prescribed set of sentences. A predicate template is coupled to a noun to form a phrase. An excitation value indicative of orientation and magnitude of excitation can be assigned to a predicate template in accordance with a classification of excitatory, inhibitory and neutral. "Excitatory" indicates a description of an event in an orientation to stimulate a function or effect of an object indicated by a noun coupled to the predicate template. "Inhibitory" indicates a description of an event in an orientation not to stimulate a function or effect of an object indicated by a noun coupled to the predicate template. "Neutral" indicates that the predicate template is neither an excitatory nor inhibitory predicate template. Excitatory and inhibitory nature of the predicate template is referred to as a polarity. The predicate template collecting device includes: a conjunction storage for storing conjunctions classified to and/thus type or but type conjunctions; and a seed template storage for storing seed templates serving as a start point for building a template network. The polarity and the excitation value are assigned to each of the seed templates.

Therefore, we can say that the polarity of predicate template represents a sign of the excitation value of the predicate template.

The predicate template collecting device further includes: noun pair collecting means for collecting noun pairs satisfying a certain relation from a prescribed corpus, and classifying polarity of relation between nouns forming each noun pair to positive or negative. The polarity of relation between nouns forming each noun pair is defined as positive if an object represented by one of the pair of nouns promotes occurrence of an object represented by the other, and defined as negative if it prevents the occurrence. The predicate template collecting device further includes: predicate template pair collecting means for collecting, from a prescribed corpus, predicate template pairs each co-occurring with each noun pair collected by the noun pair collecting means, and determining, for each of the collected predicate template pairs, whether the templates of the pair belong to the same excitatory/inhibitory class or to the opposite classes, based on the polarity of relation of the noun pair co-occurring with the predicate template pair and the conjunction coupling the predicate template pair; means for building a template network, by linking the predicate templates using the predicate template pairs collected by the predicate template pair collecting means and the results of determination as to whether the templates of each pair belong to the same excitatory/inhibitory class or to the opposite classes, a node of the template network being each predicate template and a link of the network being relation between predicate templates forming each predicate template pair; and excitation value calculating means for calculating, based on the excitation values assigned in advance to nodes corresponding to the seed templates in the template network, using the relation between nodes in the template network, an excitation value to be assigned to each node and assigning and outputting the calculated excitation value to the predicate template corresponding to each node.

Preferably, the noun pair collecting means includes classifying means for collecting, using the conjunctions stored in the conjunction storage and the seed templates stored in the seed template storage, noun pairs co-occurring with the predicate template pairs from a prescribed corpus, and for classifying the relation between nouns forming each noun pair to positive or negative.

More preferably, the classifying means includes means for collecting, using the conjunctions stored in the conjunction storage and the seed templates stored in the seed template storage, noun pairs co-occurring with the predicate template pairs and appearing at a prescribed frequency or higher in the corpus, from the corpus, for classifying the relation between nouns forming each noun pair to positive or negative.

The classifying means may include: collecting means for collecting, using the conjunctions stored in the conjunction storage and the seed templates stored in the seed template storage, noun pairs co-occurring with the predicate template pairs from the corpus; and polarity determining means for determining, for each of the combinations of noun pairs collected by the collecting means, based on the polarity of predicate template pair co-occurring with each noun pair and the type of conjunction coupling a phrase pair formed by the noun pair and the predicate templates, the polarity of relation between the nouns forming the combination of the noun pair.

More preferably, the collecting means includes means for collecting, using the conjunctions stored in the conjunction storage and the seed templates stored in the seed template storage, noun pairs co-occurring with the predicate template pairs at a prescribed frequency or higher in the corpus, from the corpus.

More preferably, the polarity determining means may include: determining means for determining, for each of the noun pairs collected by the collecting means, based on the polarity of predicate template pair of the predicate templates co-occurring with the noun pair and the type of conjunction coupling a phrase pair formed by the noun pair and the predicate templates, the polarity of relation between the nouns forming each of the noun pairs; and means for collecting, type by type of the noun pairs, polarities determined for each of the noun pairs by the determining means, and determining polarity for each type of noun pairs, by the majority.

Preferably, the predicate template collecting device further includes: determining means, responsive to completion of output of the predicate templates by the excitation value calculating means, for determining whether an end condition for the process of calculating excitation value of the predicate templates is satisfied; updating means, responsive to a determination by the determining means that the end condition is not yet satisfied, for selecting new seed templates comprised of predicate templates each having the excitation value of which absolute value is equal to or larger than a threshold value, from among the predicate templates subjected to calculation by the excitation value calculating means, for updating contents stored in the seed template storage with the newly selected seed templates; and means, responsive to updating by the updating means, for causing re-execution of processes by the predicate template pair collecting means, the noun pair collecting means, the predicate template pair collecting means, the building means and the excitation value calculating means.

More preferably, the building means includes: means for adding, if a node corresponding to a predicate template forming a predicate template pair collected by the predicate template pair collecting means is absent in the template network, a node corresponding to the predicate template; and linking means for linking predicate templates forming the predicate template pair collected by the predicate template pair collecting means. The linking means assigns to each link an attribute indicating match or mismatch of excitatory class depending on whether the predicate templates connected by each link has the same or different excitatory class. The building means further includes: weight assigning means for assigning a weight as a function of the number of links to other nodes, to each link generated by the linking means. The weight assigned by the weight assigning means has a different sign when the attribute of the link has a value indicating a match and when it has a value indicating a mismatch.

The excitation value calculating means may include means for estimating the excitation value assigned to each node of the template network by optimizing a function of the weight of each link in the template network and the excitation value assigned to each node, defined by $$E(x,W) = -\tfrac{1}{2} \times \Sigma_{ij} w_{ij} x_i x_j$$

where $x_i$ and $x_j$ are excitation values of i-th and j-th nodes, respectively, x represents a vector consisting of the excitation value of each node in the template network, and W represents a matrix consisting of the link weight $w_{ij}$. Of the seed templates, to the seed template having excitatory polarity, a positive polarity and a positive excitation value are assigned, and to the seed template having inhibitory polarity, a negative polarity and a negative excitation value are assigned.

According to the second aspect, the present invention provides a computer-executable computer program, causing a computer to function as any of the predicate template collecting devices described above.

According to the third aspect, the present invention provides a specific phrase pair collecting device, including: any of the predicate template collecting devices described above; predicate template storage means for storing predicate templates collected by the predicate template collecting device; phrase pair collecting means for collecting, from a prescribed corpus, phrase pairs each including a predicate template pair comprised of a combination of specific excitatory/inhibitory predicate templates among the predicate templates stored in the predicate template storage means and a specific type of conjunction; and phrase selecting means for selecting a phrase pair representing a prescribed relation, by extracting, from the phrase pairs collected by the phrase pair collecting means, a phrase pair of which noun pair is co-occurring with a predicate template pair and the polarity of predicate template pair in the phrase pair have a specific combination.

Preferably, the specific phrase pair collecting device further includes score calculating means for calculating, for each of the phrase pairs selected by the phrase selecting means, a score representing strength of the prescribed relation as a function of the excitation value of the predicate templates forming each phrase pair and co-occurrence relation in the corpus of the noun pair included in the phrase pair; and ranking means for ranking the phrase pairs selected by the phrase selecting means in accordance with the scores calculated by the score calculating means.

The prescribed relation may include causality, in which one phrase is a cause of the other phrase, contradiction, in which one phrase and the other phrase indicate mutually contradictory contents, or a causality hypothesis as a hypothesis, representing a causal relation not found in said corpus.

BRIEF DESCRIPTION OF DRAWINGS

FIG. 4 is a flowchart representing a control structure of a program realizing a template network builder.

FIG. 5 is a flowchart representing a control structure realizing a process for adding a link in building the template network.

FIG. 6 is a flowchart representing a control structure of a program realizing a process for calculating excitation value of each template.

FIG. 11 is a flowchart representing a control structure of a program realizing a function of acquiring causality, in accordance with the second embodiment of the present invention.

DESCRIPTION OF EMBODIMENTS

Figure 1:
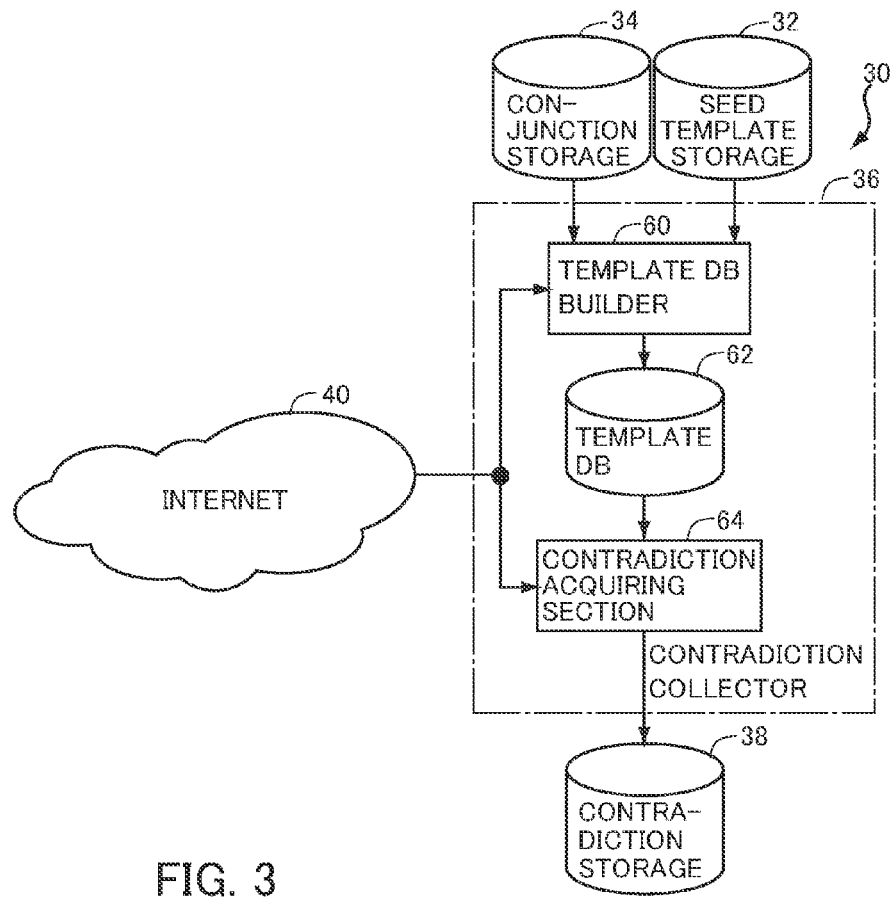
FIG. 1 is a block diagram of a contradictory expression collecting system in accordance with the first embodiment of the present invention.

In the following description and in the drawings, the same components are denoted by the same reference characters. Therefore, detailed description thereof will not be repeated. In the following description, a combination of a noun and a verb (or a predicate such as an adjective, adjective verb or the like) coupled by a particle will be referred to as a "phrase." Further, a combination of a particle and a predicate in the phrase (example: wo, taberu (eat something)) will be referred to as a "predicate template."

In the following, first, basic concepts used in the embodiments will be described. Then, how a contradiction or causality can be recognized using such concepts will be discussed. Finally, specific embodiments will be described.

[Basic Concepts]

<<Template>>

As already described, a combination of a particle and a predicate will be referred to as a "predicate template." In the embodiments of the present invention, predicate templates are classified to any one of excitatory, inhibitory and neutral classes.

<<Classification Labels>>

In the following, classification labels of predicate templates will be described. Thereafter, linguistic characteristics of the classification will be described. Further, a scheme for automatically acquiring the classification will be described. Finally, application of classified predicate templates will be described.

(1) Classification/Polarities of Predicate Templates

In the embodiments, predicate templates appearing in texts as the inputs to the overall system are classified to three types as shown in Table 1 below.

TABLE 1

| Classification | Description |
| --- | --- |
| <Excitatory> | Predicate template describing an event having an orientation to increase or stimulate a function, effect and the like of an object indicated by the noun<br>Examples: (pen) de kaku (write with a pen); (sekiyu) wo yunyu suru (import oil); (sekiyu) de tsukuru (form with oil); (kabuka) ga jyoushou suru: (stock price increases); (tabako) wo suu (smoke a cigarette); (wakuchin) wo chuusha suru (inject vaccine); etc. |
| <Inhibitory> | Predicate template describing an event having an orientation not to stimulate a function, effect and the like of an object<br>Examples: (pen) wo suteru (discard a pen); (gan) wo chiryou suru (treat cancer); (sekiyu) wo kin'yu suru (ban oil import); (kabuka) ga geraku suru (stock price plummets); (tabako) wo yameru (quit smoking); (wakuchin) wo shohou shinai (administer no vaccine); etc. |
| <Neutral> | Predicate templates other than the two above<br>Examples: (kokyo) wo omou (think of home); (kabuka) wo kanngaeru (think about stock price); (houhou) wo kento suru (consider methods) |

In the embodiments, the classification above is automatically calculated from texts. At that time, a positive excitation value is assigned to an excitatory template and a negative excitation value is assigned to an inhibitory template. Specific method of calculating the excitation value will be described later. The neutral template refers to one whose absolute value of excitation value obtained as a result of calculation is equal to or smaller than a certain threshold value. In the present specification, the classification of "excitatory," "inhibitory" and "neutral" described above and the excitation value assigned to each template are generally referred to as a "polarity" of the template. Table 2 below shows some examples.

TABLE 2

| Template | Excitation value |
| --- | --- |
| . . . de kaku (write with something) | +0.8 |
| . . . wo suu (smoke something) | +0.9 |
| wo yameru (stop something) | −0.6 |
| wo kanngaeru (think of something) | +0.00003 |

If an auxiliary verb of negation "nai" (not) or the like follows a predicate, the combination of predicate and auxiliary verb of negation is considered to be one predicate. An excitation value obtained by inverting the positive/negative sign of the excitation value of original predicate is assigned to it. Table 3 below shows some examples.

TABLE 3

| Template | Excitation value |
| --- | --- |
| de kake nai (do not write with something) | −0.8 |
| wo suwa nai (do not smoke something) | −0.9 |
| wo yame nai (do not stop something) | +0.6 |
| wo kanngae nai (do not think of something) | −0.00003 |

(2) Polarity Assignment to Predicate Template

Polarity assignment to a predicate template is automatically calculated. First, linguistic characteristics and constraints such as shown below are considered as clues to assign polarity. Initially, a noun pair is considered and a concept of causality between the noun pair is introduced.

Noun pairs having causality have two types of relations as shown in Table 4 below.

TABLE 4

| Name of relation | Examples |
| --- | --- |
| Positive causality | Example: <earthquake, tsunami> the object designated by one noun causes occurrence of the object designated by the other noun |
| Negative causality | Example: <anticancer drug, cancer> the object designated by one noun prevents occurrence of the object designated by the other noun |

The noun pairs and the polarities (signs) of excitation values of predicate templates have the following relations: (1) a product of excitation values of two predicate templates coupled by an and/thus type conjunction ( . . . node (hence), . . . tame (since), . . . te (and) etc.) will have positive polarity if nominal phrases having positive causality have dependency on the two predicate templates; (2) on the contrary, if nominal phrases having negative causality have dependency on the two predicate templates coupled by an and/thus type conjunction, a product of excitation values of the two predicate templates will have negative polarity; (3) if two verbs are coupled by a but type conjunction (, . . . ga (but), . . . nimo kakawarazu (though) etc.), the products of excitation values of two predicate templates will be opposite to those of (1) and (2), respectively.

Table 5 shows examples of the relations above. Here, noun pair <earthquake, tsunami> has positive causality, and noun pair <anticancer drug, cancer> has negative causality.

TABLE 5

| Noun pair examples | Examples | Product of excitation values |
| --- | --- | --- |
| <Earthquake, tsunami> | (Earthquake) occurred (excitation value: positive) and hit by (tsunami) (excitation value: positive) | Positive |
| <Anticancer drug, cancer> | (Anticancer drug) is injected (excitation value: positive) and (cancer) is cured (excitation value: negative) | Negative |
| <Earthquake, tsunami> | (Earthquake) occurred (excitation value: positive) but not hit by (tsunami) (excitation value: negative) | Negative |

TABLE 5-continued

| Noun pair examples | Examples | Product of excitation values |
|---|---|---|
| <Anticancer drug, cancer> | (Anticancer drug) is injected (excitation value: positive) but (cancer) is not cured (excitation value: positive) | Positive |

It is noted that a pair of predicate templates having a relation of synonymity/entailment has the same polarity. By way of example, "administer (vaccine)" and "inject (vaccine)" both have positive polarities and "(earthquake) occurs" and "(earthquake) hits" both have positive polarities. It is noted, however, that their excitation values are not always the same.

For specific calculation of excitation values, a huge amount of texts as exemplified above, that is, expressions comprised of two predicate templates each connected to a noun and coupled by and/thus type or but type conjunctions to each other, are collected from the Internet. A network of predicate templates is made by providing links between the predicate templates connected by conjunctions and predicates templates having the relation of synonymity/entailment. Information as to whether the predicate templates have the same polarity is assigned as an attribute to each link. To a small number of predicate templates on the network, excitation value of +1 or −1 is assigned in advance. As will be described later, it is possible to define an energy, similar to electron spin energy in quantum mechanics, on the network. By conducting calculation to optimize (here, minimize) the energy and thereby conducting a kind of constraint solving, the polarities of predicate templates and polarities of causality between noun pairs can be determined and calculated globally in a bootstrap-like method. As to the details of the method of calculating excitation values, see Non Patent Literature 8.

The algorithm for assigning excitation value described later is only an example, and there may be other methods of calculating specific excitation values based on an energy function considering the linguistic constraints described above.

(3) Use of Such Classification and Polarities as Described Above Allows Applications Described in the Following.

(A) The Scheme for Automatically Recognizing Causality Between Phrases

Assume that a pair of predicate templates, of which product of excitation values is positive and the absolute values of excitation values are large, co-occur with nouns having positive causality and connected by an and/thus type conjunction. Then, it is highly likely that the resulting expression represents causality. Assume that a pair of predicate templates, of which product of excitation values is negative and the absolute values of excitation values are large, co-occur with nouns having negative causality and connected by an and/thus type conjunction. In this case also, it is highly likely that the resulting expression represents causality. Utilizing such a feature, expressions representing causality, including two predicate templates and a noun pair having positive/negative causality, can automatically be recognized and acquired from among texts.

TABLE 6

| Examples | Description |
|---|---|
| Earthquake occurred (excitation value: positive, absolute value: large) and hit by tsunami (excitation value: positive, absolute value: large) | Product of excitation values of these two predicate templates is positive, and "earthquake" and "tsunami" have positive causality. Thus, the expression represents causality. |
| Demand drops (excitation value; negative, absolute value: large) and stock price declines (excitation value; negative, absolute value: large) | Product of excitation values of these two predicate templates is positive, and "demand" and "stock price" have positive causality. Thus, the expression represents causality. |
| Arouse feeling of fullness (excitation value: positive, absolute value: large) and avoid overeating (excitation value; negative, absolute value: large) | Product of excitation values of these two predicate templates is negative, and "feeling of fullness" and " overeating" have negative causality. Thus, the expression represents causality. |
| Base metabolism increases (excitation value: positive, absolute value: large) and fat is lost (excitation value; negative, absolute value: large) | Product of excitation values of these two predicate templates is negative, and "base metabolism" and "fat" have negative causality. Thus, the expression represents causality. |

The conjunction "te (and/thus)" does not always represent causality. There are numerous examples in which "te" represents other than causality. For example, consider "furo ni haitte shokuji wo suru" (take bath and have a meal). Here, generally, there is no causality between bath and meal. By the present embodiment, such phrase pairs that does not have causality can successfully be excluded and only the causality can be acquired with high accuracy.

It becomes possible to acquire causality between phrases with high accuracy by considering the constraint described above, from such a set of expressions. Once a causality is obtained, it becomes possible to predict that "tsunami possibly hits" from the information that "earthquake has occurred." The causality acquired in this manner could be a big factor for the very important technique of automatically acquiring semantic relation between phrases.

(B) The Scheme for Automatically Recognizing Contradiction Between Phrases

If predicate templates having opposite polarities occur accompanying similar nouns, it is highly likely that the templates contradict with each other. Utilizing such a characteristic, it is possible to automatically acquire contradictory phrase pairs. Specifically, to each pair of predicate templates having opposite polarities and having high probability of co-occurrence with a common noun, the common noun is embedded, and thus formed phrase pairs are collected. These phrase pairs can automatically be acquired as pairs of mutually contradictory phrases. Examples of contradictory expressions are as follows.

TABLE 7

| Contradictory phrase pairs |
|---|
| (tabako) wo suu (smoke tobacco) (polarity: positive)↔ |
| (tabako) wo yameru (stop smoking) (polarity: negative) |
| (seihin) wo siyou suru (use product) (polarity: positive)↔ |
| (seihin) wo hanbai teishi suru (stop sale of product) (polarity: negative) |

When common nouns are removed from these pairs of phrases, pairs of predicate templates are left. It is highly likely that the remaining pairs also contradict to each other. If a database of such predicate templates is built, it will be utilized as a helpful dictionary related to antonyms. Referring to the examples above, predicate template pairs containing mutually opposite meanings such as " . . . wo suu (smoke something)" and " . . . wo yameru ( . . . stop something)" can be collected.

(C) Generation of Hypotheses by Combining Causality and Contradiction Between Phrases By using (A) the scheme for automatically recognizing causality between phrases and (B) the scheme for automatically recognizing contradiction between phrases described above, it becomes possible to automatically acquire causality not explicitly described in the original texts. The scheme will be briefly described in the following.

First, from the original texts, it is possible to automatically acquire a relation of, for example, materials, by acquiring semantic relations between nouns using patterns (for this process, existing technique is available). Specifically, the relation between a product B and material A can be automatically acquired by utilizing a pattern such as "form B from A." Assume that the information that material of a product "cemented carbide tool" is "tungsten" is obtained from the result of such automatic acquisition. Then, we select predicate templates frequently co-occurs with the noun pair of "cemented carbide tool" and "tungsten" of which product of excitation values is positive and the absolute values of excitation values are large. The selected predicate templates are respectively arranged together with the noun pair. Then, we can acquire causality (in a broad meaning) between verb phrases composed of predicates (verbs) and nouns such as "import tungsten (excitation value: positive) and manufacture cemented carbide tool (excitation value: positive)." The causality here is that to "import tungsten" is to "manufacture cemented carbide tool."

Such a causality acquired in this manner may not be explicitly written in the texts. In that case, the above-described scheme is considered to successfully generate a hypothesis related to causality. Here, a constraint such as "verbs 'import' and 'manufacture' by themselves co-occur frequently in one sentence" may be utilized.

Thereafter, in the causalities of phrases composed of predicates and nouns including those acquired in the above-described manner, each of the predicate templates are replaced with predicate templates acquired by the automatic recognition of contradictory information in accordance with (B) above, each contradicting the template to be replaced. For instance, consider causality of "import tungsten and manufacture cemented carbide tool." Assume that by the technique (B), it is recognized that, of the predicate templates forming the causality, "import" is contradictory to "ban import" and "manufacture" is contradictory to "stop sale." The predicate templates included in the original causality are respectively replaced with predicate templates that are deemed contradictory to the predicate templates included in the original causality. By this procedure, a new hypothesis of causality that "since import of tungsten is banned, sale of cemented carbide tool is stopped" can be generated.

By acquiring a huge amount of causalities and their hypothesis by the above-described scheme and building a database, it becomes possible to infer a possible outcome, when new information is actually received. By way of example, assume that a causality hypothesis "since import of tungsten is banned, sale of cemented carbide tool is stopped" has been stored in the database, and a news article reporting that "import of tungsten is banned" appears. By searching the database, an inference such as "since 'import of tungsten is banned,' it is possible that 'sale of cemented carbide tool is stopped' as a result" can be drawn. In other words, a hypothesis unknown for a person not having deep knowledge of the related field can be automatically generated.

Generation of hypothesis as described above simply starts from the initial information described in simple and frequently occurring patterns such as "form cemented carbide tool from tungsten." Meanwhile, information related to excitatory/inhibitory nature of predicate templates is extracted from texts not having any relation to cemented carbide tool or tungsten. By combining these pieces of information, causality hypothesis can be generated. Specifically, even when the expression "form cemented carbide tool from tungsten" is the only reference to the cemented carbide tool and tungsten in the input texts, generation of such a hypothesis as described above is possible. As a result, it becomes possible to obtain a highly sophisticated hypothesis that "manufacturing of cemented carbide tool is possibly banned" from very limited information. Thus, this technique could serve as the core technique for advanced use of information.

(D) Improving Accuracy of Automatically Acquiring Expressions Having Relations of Synonymity/Entailment According to the conventional technique for automatically acquiring relations of synonymity/entailment, synonyms and entailments are recognized based on similarity in distribution of probability of occurrence of words that appear near the expression of interest. As already described, however, a word B, which is an antonym of a word A, is often erroneously recognized as having a relation of synonymity or entailment with word A. This is because contexts in which an antonym appears are similar. In this respect, according to the present embodiment, that the expression "wo hikiokosu (cause something)" has positive excitation value and the expression "wo fusegu" (prevent something)" has negative excitation value can automatically be calculated. Using these pieces of information, it becomes possible to distinguish, among candidates of synonymous expressions extracted by the conventional art, whether a candidate is a synonym, depending on whether the polarity of predicate template is different. As a result, the technique of the present embodiment improves accuracy in automatically acquiring synonyms and entailments of words.

(E) the Scheme for Automatically Acquiring Causality Bridging Sentences

By the techniques (A) and (C) described above, a huge number of causalities can be collected. By building a database of the huge number of causalities, pairs of predicate templates frequently appearing in causality expressions can be acquired. For instance, assume that a pair of predicate templates consisting of "ga okita (something occurred)" and "ni osowareta (hit by something)" appears frequently in causalities of the database. It is highly likely that such predicate templates represent causality even when they appear in bridging sentences (in separate sentences) in the texts, if the "distance" such as the number of sentences, number of words or number of characters between each other is close. Consider an example in which the expressions "jishin ga okita (earthquake occurred)" and "tsunami ni osowareta (hit by tsunami)" appear in two separate sentences, such as "Kinou jishinn ga okita. (Yesterday, an earthquake occurred.) Tunami ni osowareta tono houkoku ga yoserarete iru (Hits by tsunamis are reported)." In this case also, events described by the two phrases "jishin ga okita (earthquake occurred)" and "tsunami ni osowareta (hits by tsunamis)" have causality. Further, the noun pair appearing in these phrases, that is, "jishin (earthquake)" and "tsunami" also have causality. Utilizing such a characteristic, it is possible to automatically acquire causality described in bridging sentences, both for the phrases and words.

In the following, the configuration and operation of the system in accordance with embodiments of the invention based on the idea above will be described. In the embodiments described below, the first embodiment is directed to a system for automatically collecting contradiction as one logical relation between phrases, using the above-described technique of extracting phrase pairs. The second embodiment is directed to a system applying the above-described technique of extracting phrase pairs to acquisition of causality as another example of logical relation between phrases. The third and fourth embodiments are directed to a system for generating a causality hypothesis.

First Embodiment

Configuration

Referring to FIG. 1, a contradiction collecting system 30 in accordance with the first embodiment of the present invention includes: a seed template storage 32 for storing templates (which will be referred to as "seed templates") serving as a core in building a template network, among predicate templates described above; a conjunction storage 34 for storing and/thus type and but type conjunctions coupling predicate templates; a contradiction collector 36 for collecting, from seed template storage 32, conjunction storage 34 and from a corpus on the Internet 40, a huge amount of phrase pairs each consisting of two phrases coupled by the conjunction stored in conjunction storage 34 and acquiring mutually contradictory expressions (opposite expressions) therefrom; and a contradiction storage 38 for storing contradictions collected by contradiction collector 36.

Contradiction collector 36 includes: a template DB builder 60 connected to seed template storage 32, conjunction storage 34 and the Internet 40 for collecting a huge number of phrase pairs from a virtual corpus on the Internet 40 and taking out a huge number of predicate templates to build a template database (DB) 62; and a contradiction acquiring section 64 for acquiring, using the template DB 62 built by template DB builder 60, contradictions from the virtual corpus on the Internet 40. Each template stored in seed template storage 32 has a positive or negative excitation value depending on whether the template is excitatory/inhibitory, assigned in advance. At the start of the process described in the following, these values are +1 and −1, respectively.

Figure 2:
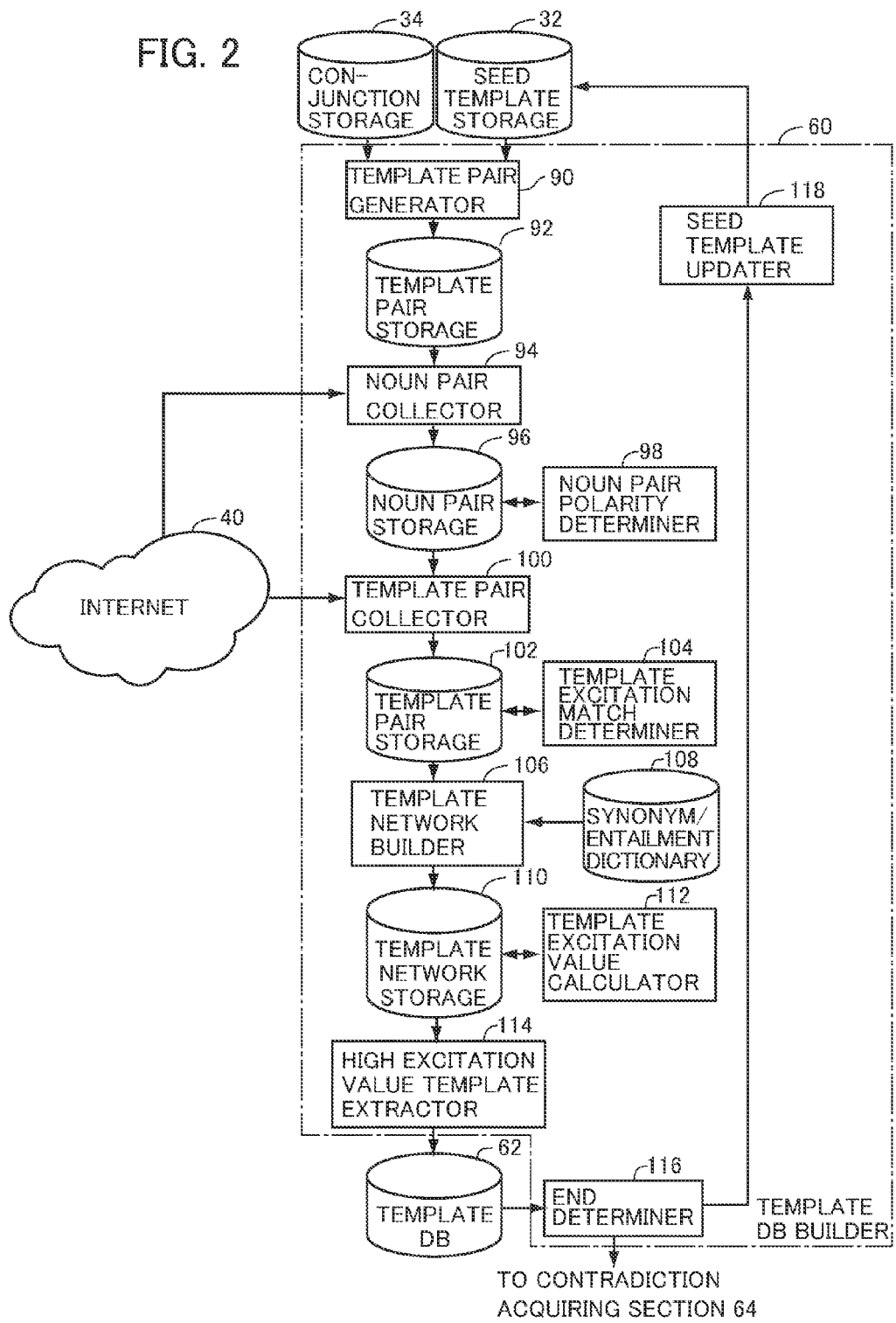
FIG. 2 is a more detailed block diagram of a template DB builder shown in FIG. 1.

Referring to FIG. 2, template DB builder 60 includes: a template pair generator 90, connected to seed template storage 32 and conjunction storage 34 for generating, using all templates stored in seed template storage 32 and all conjunctions stored in conjunction storage 34, all combinations of two templates coupled by each conjunction; and template pair storage 92 for storing template pairs generated by template pair generator 90. Exemplary forms of template pairs generated by template pair generator 90 are as shown below.

TABLE 8

| Case | 1st template | Conjunction | 2nd template |
|---|---|---|---|
| a. | cause (1st noun) | and (and/thus type) | generate (2nd noun) |
| b. | cause (1st noun) | thus (and/thus type) | prevent (2nd noun) |
| c. | generate (1st noun) | but (but type) | prevent (2nd noun) |

Template DB builder 60 further includes: a noun pair collector 94 for collecting, for each of the template pairs stored in template pair storage 92, a noun pair that co-occurs with the template pair, from the Internet 40; noun pair storage 96 for storing noun pairs collected by noun pair collector 94; and a noun pair polarity determiner 98, connected to noun pair storage 96, for determining relation between nouns included in each of the noun pairs stored in noun pair storage 96, based on the polarities of predicate template co-occurred with the nouns and on the type of conjunction stored in conjunction storage 34, and attaching a tag indicating the relation to each noun pair.

Here, noun pair polarity determiner 98 determines the relation between nouns forming a noun pair in accordance with the method shown in Table 9 below.

TABLE 9

| Cases of Table 8 | Examples | Relation |
|---|---|---|
| Matching a. | (Earthquake, tsunami) | Positive |
| Matching b. | (Secretion of saliva, dry mouth) | Negative |
| Matching c. | (Acetaldehyde, hepatic disorder) | Positive |

Specifically, the relation of noun pair co-occurring with two predicate templates can be determined in the following manner.

(1) If the two predicate templates have the same polarities and are coupled by an and/thus type conjunction, the noun pair co-occurring with the templates has a positive relation.

(2) If the two predicate templates have the same polarities and are coupled by a but type conjunction, the noun pair co-occurring with the templates has a negative relation.

(3) If the two predicate templates have opposite polarities and are coupled by an and/thus type conjunction, the noun pair co-occurring with the templates has a negative relation.

(4) If the two predicate templates have opposite polarities and are coupled by a but type conjunction, the noun pair co-occurring with the templates has a positive relation.

Template DB builder 60 further includes: template pair collector 100, connected to noun pair storage 96 for collecting, for each of the noun pairs having a relation tag assigned by noun pair polarity determiner 98, a template pair co-occurring therewith from the Internet 40; template pair storage 102 for storing the template pairs collected by template pair collector 100 in association with their co-occurring noun pairs; and a template excitation match determiner 104 for determining, for each of the template pairs stored in template pair storage 102, whether the templates have the same excitatory/inhibitory class (matching or not), based on the relation (positive/negative) of the noun pair co-occurring with the template pair and based on whether the conjunction coupling the templates is an and/thus type or but type conjunction, and assigning the result as a tag to each template pair.

Whether the pair of templates has the same excitatory/inhibitory class can be determined by the following method. As shown in Table 9, the relation between noun pair <earthquake, tsunami> is positive, noun pair <secretion of saliva, dry mouth> is negative, and the relation between noun pair <acetaldehyde, hepatic disorder> is positive.

TABLE 10

| 1st predicate template | Conjunction | 2nd predicate template | Match determination |
|---|---|---|---|
| (Earthquake) stops | node (hence) | prevents (tsunami) | same |
| Cause (earthquake) | ga (but) | prevents (tsunami) | opposite |
| (Earthquake) occurs | ga (but) | prevents (tsunami) | opposite |
| Promote (secretion of saliva) | te (and) | prevents (dry mouth) | opposite |
| Prevent (secretion of saliva) | node (hence) | causes (dry mouth) | opposite |
| Generate (acetaldehyde) | tame (because) | develops (hepatic disorder) | same |

Specifically, whether the pair of templates has the same excitatory/inhibitory class or not can be determined by the following conditions.

(1) If the template pair co-occurs with a noun pair having positive relation and the templates are connected by an and/thus type conjunction, the pair of templates has the same excitatory/inhibitory class.

(2) If the template pair co-occurs with a noun pair having positive relation and the templates are connected by a but type conjunction, the pair of templates has the opposite excitatory/inhibitory class.

(3) If the template pair co-occurs with a noun pair having negative relation and the templates are connected by an and/thus type conjunction, the pair of templates has the opposite excitatory/inhibitory class.

(4) If the template pair co-occurs with a noun pair having negative relation and the templates are connected by a but type conjunction, the pair of templates has the same excitatory/inhibitory class.

Template DB builder 60 further includes: a template network builder 106 for building a network among the templates based on the template pairs stored in template pair storage 102 and the results of match determination thereof; and a synonym/entailment relation dictionary used for adding links between each of the templates when the template network builder 106 builds the network. In the present specification, the network will be referred to as a "template network."

Figure 3:
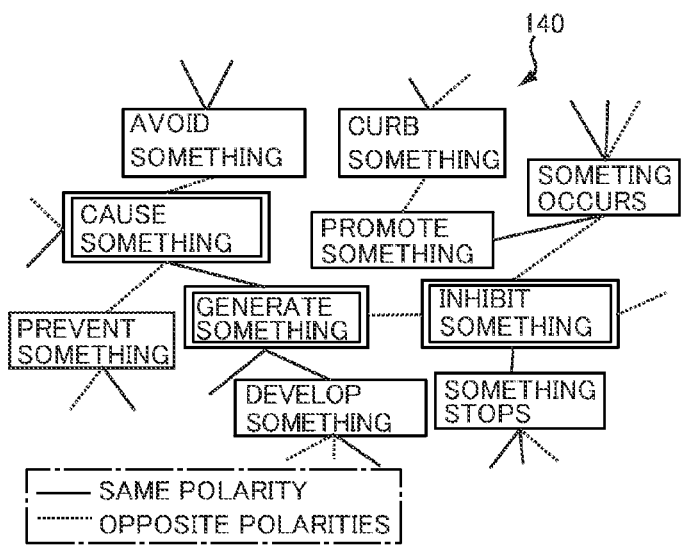
FIG. 3 schematically shows a configuration of a template network.

Referring to FIG. 3, by way of example, a template network 140 includes a plurality of nodes, each of which corresponds to one template, and links defined between the nodes. A link is provided between nodes corresponding to templates of which match determination shown in Table 9 has been done. Each link has an attribute of same polarity or opposite polarity, assigned in accordance with the result of match determination (Table 9) between the templates at the nodes of opposite ends of the link. In FIG. 3, the link having the same polarity assigned is represented by a solid line, and the link having the opposite polarity assigned is represented by a dotted line. As will be described later, excitation value of each template is calculated utilizing the links. In order to calculate the excitation value, of the nodes in template network 140, the values +1 or −1 are manually assigned in advance to the seed templates (nodes such as "cause," "generate", "prevent" of FIG. 3) stored in seed template storage 32. The excitation values of the nodes (templates) are calculated using these values, links among the nodes, and the attributes of the links. Specific method of calculation will be described later.

Again referring to FIG. 2, template DB builder 60 further includes: a template network storage 110, connected to network builder 106, for storing the template network 140 built by template network builder 106; a template excitation value calculator 112 for calculating, for each node of template network 140 stored in template network storage 110, the excitation value of each node (template) based on the excitation value of +1 or −1 assigned in advance to the seed templates, and assigning the excitation value to each node (template); a high excitation value template extractor 114 for extracting, from the nodes (templates) of template network 140 stored in template network storage 110, only those of which absolute values of excitation values calculated by template excitation value calculator 112 are large, and for building template DB 62 with the extracted templates; an end determiner 116 for determining whether or not a predetermined end condition for building template DB is satisfied; and a seed template updater 118, responsive to a determination that the end condition is not satisfied by end determiner 116, for updating the seed template storage 32 using the template stored in template DB 62 as the new seed templates, and again causing template DB builder 60 to execute the process for building a template DB. If it is determined by end determiner 116 that the end condition is satisfied, the operation of template DB builder 60 ends, and contradiction acquiring section 64 is activated.

As will be described later, each section of contradiction collector 36 is realized by computer hardware and a computer program executed by the computer hardware.

Template pair generator 90 generates pairs of templates by simply coupling all the combinations of seed templates stored in seed template storage 32 with all the conjunctions stored in conjunction storage 34. A typical example of a template pair is "Cause (noun 1)" "node (hence)" "generate (noun 2)".

Noun pair collector 94 is in charge of the following process. We can conceive a noun pair that co-occurs in one sentence with the combination of template pair+conjunction. Such a noun pair can be classified to one having mutually positive relation or one having mutually negative relation. The positive/negative relation of noun pair is determined by the combination of excitatory/inhibitory class of co-occurring template pair and the conjunction.

TABLE 11

| | Excitatory/inhibitory match of template pair | |
|---|---|---|
| Conjunction | Same | Opposite |
| And/thus type (example: node (hence)) | Positive relation (Example 1) | Negative relation (Example 2) |
| But type (example: ga (but)) | Negative relation (Example 3) | Positive relation (Example 4) |

Example 1

Cause (earthquake) (excitatory) . . . node (hence) . . . generates (tsunami) (excitatory)

Example 2

Cause (secretion of saliva) (excitatory) . . . node (hence) . . . prevents (dry mouth) (inhibitory)

Example 3

Harm (ozone layer) (inhibitory) . . . ga (but) . . . intercept (ultraviolet ray) (inhibitory)

Example 4

Generate (acetaldehyde) (excitatory) . . . ga (but) . . . prevents (hepatic disorder) (inhibitory)

Template pair collector 100 performs the following process. Consider noun pairs determined to appear on the Internet 40 only as pairs having positive relations by noun pair polarity determiner 98. Of these pairs, only the noun pairs of which frequencies of occurrence are equal to or higher than a prescribed number are left as positive relation noun pairs. Similarly, of noun pairs appearing on the Internet 40 only as pairs having negative relations, only the noun pairs of which frequencies of occurrence are equal to or higher than a prescribed number are left as negative relation noun pairs. Here, the prescribed number as the threshold for selecting the positive relation noun pairs may be or may not be the same as the prescribed number as the threshold for selecting the negative relation noun pairs.

Template excitation match determiner 104 classifies template pairs that co-occur in one sentence with the remaining positive/negative noun pairs+conjunction, to templates having the same excitatory/inhibitory class (same) and opposite class (opposite), in accordance with the determination method shown in Table 12 below. Here, some template pairs may sometimes appear on the Internet 40 as having the same excitatory/inhibitory class, and having opposite excitatory/inhibitory class at other times. For such pairs, frequency of occurrence as the pair having the same class is compared with that as the pair having the opposite class, and the class is determined by the majority.

TABLE 12

| | Positive relation noun pair | Negative relation noun pair |
|---|---|---|
| And/thus type (example: node (hence)) | Same (Example 1) | Opposite (Example 2) |
| But type (example: ga (but)) | Opposite (Example 3) | Same (Example 4) |

Example 1

(Earthquake) stops (inhibitory) . . . node (hence) . . . prevents (tsunami) (inhibitory)

Example 2

Prevents (secretion of saliva) (inhibitory) . . . node (hence) . . . cause (dry mouth) (excitatory)

Example 3

Generates (Acetaldehyde) (excitatory) . . . ga (but) . . . prevents (hepatic disorder) (inhibitory)

Example 4

Maintain (ozone layer) (excitatory) . . . ga (but) . . . exposed to (ultraviolet ray) (excitatory)

Referring to FIG. 4, the program for realizing the template network builder 106 shown in FIG. 2 is activated when template pairs are stored in template pair storage 102 and excitation match determination for each template pair by template excitation match determiner 104 is completed. The program includes: a step 150 of initialization, including ensuring a prescribed storage area on a memory, inputting initial values to prescribed areas for variables of the storage area, and building an initial, empty template network 140; and a step 152 of executing a process 154, for every template pair stored in template pair storage 102. The process 154 is for adding templates forming each template pair and a link therebetween to the template network 140. It is assumed that at step 150, an empty network has already been built as template network 140.

The process 154 includes: a step 180 of determining, for each of the templates included in the template pair under processing, whether the corresponding node exists in template network 140, that is, whether the node is to be added to template network 140; a step 182, executed if the determination at step 180 is positive, of adding the node or nodes (one or two) determined to be added to template network 140, to the template network 140; a step 184, executed after steps 180 and 182, of determining whether or not a link exists between the nodes corresponding to the template pair under processing; and a step 186, executed if the determination at step 184 is in the negative, of adding the link to template network 140 and ends the process 154. If the determination at step 184 is in the positive, the execution of process 154 for the template pair is terminated.

The program realizing template network builder 106 further includes: a step 164, executed after the end of processing at step 152, of adding a link to built template network 140, by looking up synonym/entailment dictionary 108; a step 166 of deleting, in the template network 140 obtained as a result of step 164, a node of which number of links to other nodes is equal to or smaller than a prescribed number; and a step 168 of calculating a weight of each link based on the number of nodes to which each node links (method of calculation will be described later), adding the weight to each link, and ending the process.

Referring to FIG. 5, the program portion (routine) executed at step 164 of adding links shown in FIG. 4 includes a step 200 of executing the following process 202 on all the node pairs not having any link therebetween, among the nodes in template network 140.

The process 202 includes: a step 210 of determining whether or not a specific relation exists between the node pairs under processing; and a step 212 of adding, if the determination at step 210 is in the positive, a link having the attribute "same" to the node pairs under processing, and ending the process 202. The process 202 also ends if the determination at step 210 is in the negative. Determination as to the presence/absence of specific relation here utilizes grammatical information of a verb and the relation of synonymity/entailment of words stored in synonym/entailment dictionary 108 shown in FIG. 2, as shown below.

TABLE 13

| Relation | Examples |
|---|---|
| "Infinitive - passive voice" relation | "use" - "used" |
| "Infinitive - causative voice" relation | "use" - "let use" |
| Synonym/entailment relation | "use" - "utilize" |

At step 168, weight of each link is calculated. The weight given to a link between a template i and a template j will be denoted as $w_{ij}$. The weight $w_{ij}$ is calculated by Equation (1) below.

$$w_{ij} = \begin{cases} 1/\sqrt{d(i)d(j)} & \text{if SAME}(i, j) \\ -1/\sqrt{d(i)d(j)} & \text{if OPPOSITE}(i, j) \end{cases} \quad (1)$$

where d(i) represents the number of templates linked to template i. SAME(i, j) indicates that the attribute "same" is assigned to the link between template i and template j. OPPOSITE(i, j) indicates that the attribute "opposite" is assigned to the link between template i and template j. Specifically, if the SAME attribute is assigned to templates i and j, the weight has a positive value, and if the OPPOSITE attribute is assigned, the sign of weight is inverted to a negative value.

A template excitation value calculator 112 shown in FIG. 2 calculates the excitation value of each node in accordance with the method as described in the following, for each node of template network 140 stored in template network storage 110. Referring to FIG. 6, execution of a computer program realizing template excitation value calculator 112 is started when template network 140 is stored in template network storage 110 and weight is assigned to each link. The program includes: a step 240 of assigning, for nodes corresponding to the seed templates among the nodes in template network 140, excitation values given in advance to the seed templates (+1 to excitatory seed plates, and −1 to inhibitory seed templates), and assigning prescribed initial values to other nodes; and a step 242, following step 240, of optimizing (here, minimizing) the value E(x, W) defined by the Equation below, and thereby estimating the excitation value of each node.

$$E(x, W) = -\tfrac{1}{2} \times \Sigma_{ij} w_{ij} x_i x_j \qquad (2)$$

where $x_i$ and $x_j$ are signed excitation values of templates i and j, respectively, x represents a vector consisting of the excitation values, and W represents a matrix consisting of the link weights $w_{ij}$, respectively. The value E is similar to the equation for calculating electron spin energy in quantum mechanics, and it can be processed in the similar manner as the calculation for minimizing energy in quantum mechanics. Of the terms in sigma of this equation, the value $x_i x_j$ tends to be a positive value if the polarities of $x_i$ and $x_j$ are the same, and tends to be a negative value if the polarities are different, after the energy minimization calculation. The sign of weight $w_{ij}$ is positive if the polarities of $x_i$ and $x_j$ are the same, and negative if the polarities are different. Therefore, the value of each term in sigma tends to always have a positive value. By maximizing these, a sort of constraint solving is realized. In Equation (2), a coefficient "−½" precedes sigma and, therefore, by maximizing sigma, the value E(x, W) is minimized.

Figure 7:
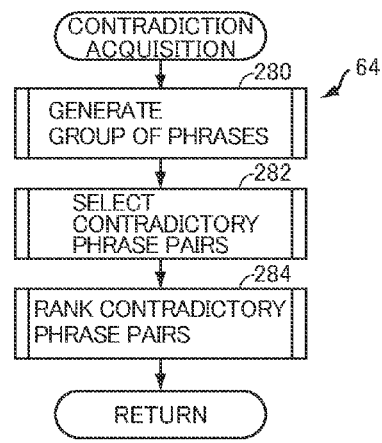
FIG. 7 is a flowchart representing a control structure of a program realizing a contradictory expression acquiring process.

Contradiction acquiring section 64 shown in FIG. 1 is also realized by a computer program. Referring to FIG. 7, the computer program for realizing contradiction acquiring section 64 includes: a step 280 of generating a group of phrases; a step 282 of selecting, from the group of phrases generated at step 280, contradictory phrase pairs each composed of two phrases considered to be mutually contradictory expressions (having opposite meanings); and a step 284 of ranking the contradictory phrase pairs selected at step 282 using a prescribed score.

Here, the contradictory pair refers to a pair of phrases that satisfy the following conditions.

(1) Each of the two phrases consists of one noun and one excitatory or inhibitory template. Example: "(kaze) ni kakaru: catch (cold)" and "(kaze) wo yobo suru: prevent (cold)".

(2) Two nouns included in the two phrases are the same (or have the same meaning) Example: combination such as <kaze, kambo> (cold, rheum) or <kaze, kaze> (cold, cold).

(3) One of the two templates included in the two phrases is excitatory and the other is inhibitory. Example: "ni kakaru (catch)" (excitatory) and "wo yobo suru (prevent)" (inhibitory).

(4) The two templates share many nouns that co-occur (have dependency) on the Internet. Specifically, these two templates have high similarity of distribution. For example, nouns co-occurring with "ni kakaru (catch)" may include kaze (cold), kambo (rheum), haien (pneumonia), while nouns co-occurring with "wo yobo suru (prevent)" may include kaze (cold), kambo (rheum), haien (pneumonia), kaji (fire), saigai (disaster) and similarity of distribution is high between the two.

(5) The frequency of occurrence of each phrase is equal to or higher than a prescribed threshold value on the Internet. Specifically, the noun in each phrase and the template have the dependency relation with the frequency being equal to or higher than the threshold value. By way of example, it is necessary that the condition of frequency of occurrence "(kaze) ni kakaru: catch (cold)" threshold value and the condition of "(kaze) wo yobo suru: prevent (cold)" threshold value must both be satisfied.

Figure 8:
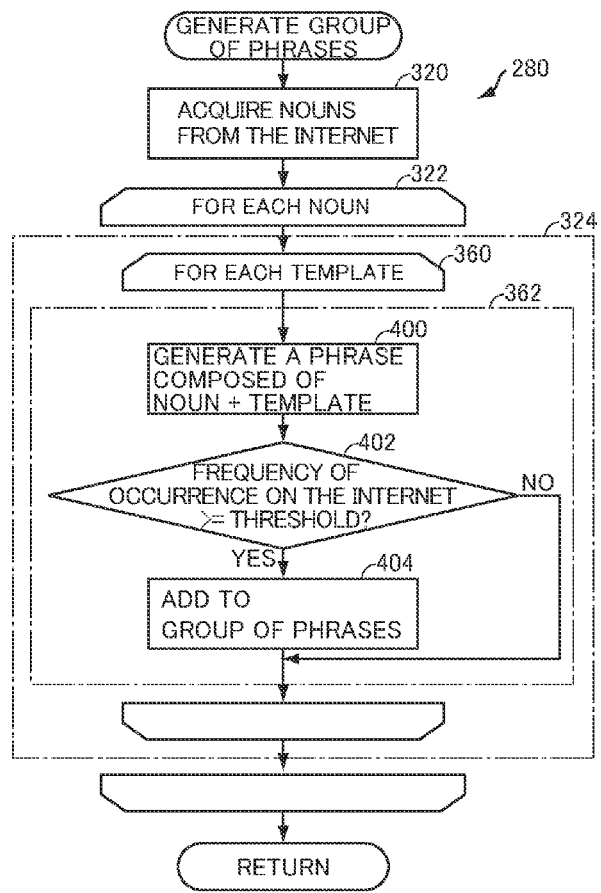
FIG. 8 is a flowchart representing a control structure of a program portion realizing a process for generating a phrase group, of the program having the control structure shown in FIG. 7.

The process for extracting the contradictory pair by executing the process described above is executed at step 280 of FIG. 7. Referring to FIG. 8, the program portion 280 includes: a step 320 of obtaining nouns from the Internet 40; and a step 322 of executing the following process 324 on all obtained nouns. The process 324 includes a step 360 of executing the following process 362 on every template stored in template DB 62, for the noun under processing.

The process 362 includes: a step 400 of generating a phrase by coupling a noun under processing with a template under processing; a step 402 of determining whether the frequency of occurrence of the phrase on the Internet 40 is equal to or higher than the threshold value mentioned above; and a step 404, executed if the determination at step 402 is in the positive, of adding the phrase to the group of phrases and ending the process 362. If the determination at step 402 is in the negative, the phrase is not added to the group of phrases.

By executing the program shown in FIG. 8, a large number of excitatory phrases and inhibitory phrases are generated. Examples of excitatory phrases include "wo hikiokosu (cause something)" and "ni kakaru (suffer from something)", and examples of inhibitory phrases include "wo fusegu (prevent something)" and "wo yobo suru (avoid something)". Assume that nouns such as "jishin (earthquake)", "tsunami", "kaze (cold)" and "kanbo (rheum)" are obtained as examples, from the Internet 40. Here, excitatory phrases and inhibitory phrases with high frequency of occurrence would be as shown below. These phrases are added to the group of phrases and used as inputs to the following step 282 of FIG. 7.

TABLE 14

| Examples of excitatory phrases | Examples of inhibitory phrases |
| --- | --- |
| jishin wo hikiokosu (cause earthquake) | tsunami wo fusegu (prevent tsunami) |
| tunami wo hikiokosu (cause tsunami) | kanbo wo fusegu (prevent rhume) |
| kaze ni kakaru (catch cold) | kaze wo yobo suru (avoid cold) |

Figure 9:
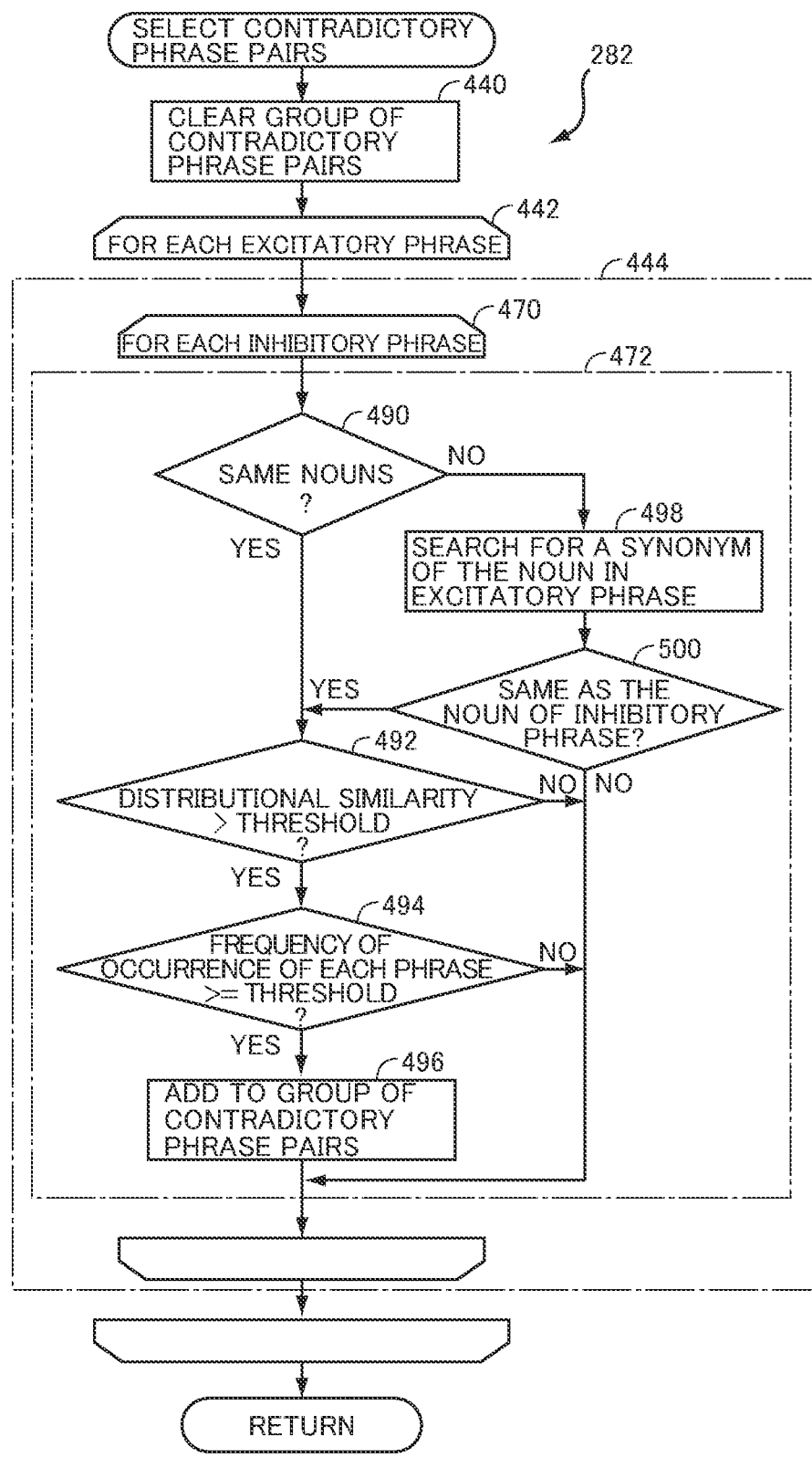
FIG. 9 is a flowchart representing a control structure of a program portion realizing a process for selecting contradictory phrase pairs, of the program having the control structure shown in FIG. 7.

The program portion realizing step 282 of FIG. 7 has such a control structure as shown in FIG. 9. Referring to FIG. 9, the program portion includes: a step 440 of clearing an area allocated in advance in the storage as an area for storing contradictory phrases; and a step 442 of executing a process 444 on all excitatory phrases among the group of phrases obtained at step 280.

The process 444 includes a step 470 of executing the following process 472 on all inhibitory phrases.

The process 472 includes: a step 490 of determining, for the excitatory and inhibitory phrases under processing, whether the nouns included in these two are the same; a step 498, executed if the determination at step 490 is in the negative, of searching, for example, a dictionary of the same type as synonym/entailment dictionary 108 shown in FIG. 2, for a word as a synonym of the noun included in the excitatory phrase; and a step 500 of determining whether or not any of the words found at step 498 coincides with the noun in the inhibitory phrase. If the determination at step 500 is in the negative, execution of the process 472 ends.

If the determination at step 490 is in the positive and the determination at step 500 is in the positive, the control proceeds to step 492. At step 492, whether the distributional similarity of the excitatory phrase and the inhibitory phrase is higher than a threshold value is determined. If the determination at step 492 is positive, the control proceeds to step 494. At step 494, whether the frequency of occurrence of each phrase on the Internet 40 is equal to or higher than a prescribed threshold value is determined. If the determination is in the positive, the pair of excitatory phrase and inhibitory phrase under processing is added to the group of phrase pairs (step 496), and otherwise, the pair is discarded.

Figure 10:
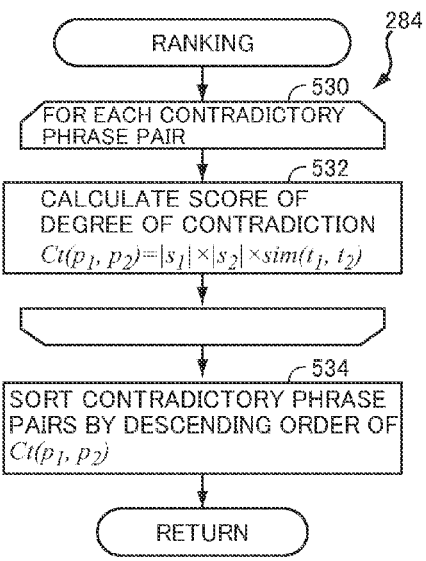
FIG. 10 is a flowchart representing a control structure of a program portion realizing a process for ranking contradictory phrase pairs, of the program having the control structure shown in FIG. 7.

The program portion of realizing the ranking executed at step 284 of FIG. 7 has, in the present embodiment, such a control structure as shown in FIG. 10. Referring to FIG. 10, the program includes: a step 530 of executing, on every contradictory phrase pair selected at step 282 of FIG. 7, a step 532 of calculating a score indicating the degree of contradiction of the contradictory pair; and a step 534 executed when the process of step 530 is completed for every contradictory phrase pair, of sorting and outputting all contradictory phrase pairs in descending order of the score and ending the process.

The score calculated at step 532 is, in the present embodiment, the score $C_t(p_1, p_2)$ calculated by the equation below.

$$C_t(p_1,p_2)=|s_1|\times|s_2|\times sim(t_1,t_2)$$

where $p_1$ and $p_2$ represent phrases forming the contradictory pair, respectively, $t_1$ and $t_2$ represent templates included in $p_1$ and $p_2$, $s_1$ and $s_2$ represent excitation values of templates $t_1$ and $t_2$, respectively, $|s_1|$ represents absolute value of excitation value $s_1$, and $sim(t_1, t_2)$ represent distributional similarity of templates $t_1$ and $t_2$, respectively.

[Operation]

Contradiction collecting system 30 in accordance with the first embodiment operates in the following manner. Referring to FIG. 1, a small number of seed templates are stored in seed template storage 32. Whether each seed plate is excitatory or inhibitory has been determined in advance, and each template has the corresponding tag. In conjunction storage 34, and/thus type conjunctions and but type conjunctions in Japanese are stored. Information indicating whether it is an and/thus type or but type is assigned to each of these in advance.

Template DB builder 60 builds template DB 62 through the following operation. Referring to FIG. 2, template pair generator 90 generates all possible combinations of all pairs of seed templates stored in seed template storage 32 with all conjunctions stored in conjunction storage 34, and stores all results as template pairs, in template pair storage 92. Noun pair collector 94 collects, for each template pair stored in template pair storage 92, noun pairs that co-occur with the template pair from the Internet 40, and stores the results in noun pair storage 96. Noun pair polarity determiner 98 determines, for each noun pair, whether the noun pair has a positive or negative relation, in accordance with the excitatory/inhibitory class of templates in the template pair co-occurring with the noun pair and the type of conjunction coupling the template pair, and assigns a corresponding tag to each noun pair.

Thereafter, template pair collector 100 collects, for each noun pair, template pairs that co-occur with the noun pair from the Internet 40, and stores them in template pair storage 102. For each of the template pairs, template excitation match determiner 104 determines whether the templates constituting the template pair belong to the same excitatory/inhibitory class or to the opposite classes, in accordance with the positive/negative relation of the co-occurring noun pair and the type of conjunction (and/thus type, but type). Here, if a certain template pair appears sometimes as a pair having the same excitatory/inhibitory class and as a pair having opposite excitatory/inhibitory class at other times, the number of occurrence of the same class is compared with that of the opposite class, and whether the classes are the same or opposite is determined by the majority. Template excitation match determiner 104 assigns, for each template pair stored in template pair storage 102, a tag indicating whether their excitatory/inhibitory class is the same or opposite.

Template network builder 106 builds template network 140 based on the template pairs stored in template pair storage 102. If the network does not include nodes corresponding to two templates forming a template pair, template network builder 106 adds such nodes to the network, and if the link is not included, it also adds the link. Such a process is executed for every template pair, and thus the prototype of template network 140 is built. Further, for every pair of nodes not linked in the network, template network builder 106 determines whether or not a specific relation such as shown in Table 13 exists between the templates corresponding to the nodes, by looking up synonym/entailment dictionary 108, and if such a relation exists, provides a "SAME" link therebetween. Further, template network builder 106 assigns, to each link of the network thus built, the weight calculated in accordance with Equation (1). The template network 140 having links added in this manner is stored in template network storage 110.

Template excitation value calculator 112 executes the process shown in FIG. 6. Specifically, first, it assigns the excitation value of +1 or −1 to each seed template, in accordance with its excitatory/inhibitory class (step 240). Then, by executing the process of minimizing the value E(x, W) defined as the amount similar to the electron spin energy (step 242), the excitation value of each template is estimated, and the excitation value is assigned to each template. The excitation value may be positive or negative. High excitation value template extractor 114 selects, from among the templates having their excitation values estimated in this manner, those having the excitation values of which absolute values are higher than a prescribed threshold value, and using these templates, builds template DB 62. Here, rather than selection using a threshold value, the templates may be ranked in accordance with the magnitude of excitation values.

End determiner 116 shown in FIG. 2 determines whether the prescribed end condition is satisfied, when template DB 62 is built. The end condition may be that the number of iteration has reached a prescribed number, or that the number of templates has exceeded a prescribed number. If the end condition is satisfied, template DB 62 is considered complete. If the end condition is not satisfied, seed template updater 118 updates seed template storage 32 using the templates contained in template DB 62 as seed templates. Since these seed templates have the excitation values calculated by the process described above, similar processes as described above are executed utilizing the excitation values.

The above-described processes are repeated and if the end condition is satisfied, template DB 62 is complete. Then, contradiction acquiring section 64 executes the process of acquiring contradictions from the Internet 40, using template DB 62.

Specifically, contradiction acquiring section 64 generates a group of phrases, as shown in FIG. 7. That is, referring to FIG. 8, nouns are obtained from the Internet 40 (step 320), and for every combination of each noun and each template in template DB 62 (step 322, process 324, steps 360), a phrase consisting of the noun and the template is generated (step 400). If the frequency of occurrence of the phrase on the Internet is equal to or higher than a prescribed value, the phrase is added to the group of phrases to be used in the subsequent process, and the phrase is discarded otherwise. This process is executed on combinations of every noun and every template and, thus, phrases that occur at a certain frequency can be obtained.

Thereafter, contradiction acquiring section 64 selects contradictory phrase pairs from the thus generated group of phrases in the following manner. Specifically, the area for storing contradictory phrase pairs is cleared (step 440 of FIG. 9), and on all combinations of excitatory phrases and inhibitory phrases included in the group of phrases (step 442, process 444, step 470), whether the nouns included in the two phrases are the same or synonymous is determined (steps 490, 498, 500). If the nouns of the two phrases are the same or synonymous, whether the distributional similarity of the template pair included in the phrase pair is higher than a threshold value or not is determined. If the determination is in the negative, the phrase pair is discarded. If the determination is in the positive, whether the frequency of occurrence of the phrase pair is both equal to or higher than a threshold value is determined at step 494. If the determination is in the negative, the phrase pair is discarded. If the determination is in the positive, the phrase pair is added to the contradictory phrase pair group (step 496).

Contradiction acquiring section 64 repeats the above-described process on the phrase pairs composed of every combination of excitatory phrase and inhibitory phrase. As a result, a huge group of contradictory phrase pairs can automatically be acquired.

Further, for every contradictory phrase pair acquired in this manner, the score indicating the degree of contradiction is calculated as represented by step 532 of FIG. 10. Using the scores, the contradictory phrase pairs are sorted and output in the descending order of the scores.

By the process described above, a huge number of contradictory phrase pairs can automatically be obtained. The required manual labor is only the setting of initial seed templates, determination of their excitatory/inhibitory class and setting of excitation values. Other resources are all conventionally available. Further, since the contradictory phrase pairs are eventually sorted in the descending order of scores, contradictory expressions can be selected starting from those having high reliability.

Second Embodiment

In the contradiction collecting system 30 of the first embodiment described above, template DB 62 can be obtained by template DB builder 60. Template DB 62 can be used not only for acquiring contradictions as in the first embodiment but also for various other processes. The second embodiment is directed to an example in which template DB 62 is used for acquiring causality. The second embodiment can be realized by adopting a processing section for acquiring causality expressions from the Internet 40, in place of contradiction acquiring section 64 of FIG. 1. Such a processing section can be realized by a computer program.

Referring to FIG. 11, the process for acquiring causality can be done in the following manner. First, at step 570, phrase pairs, each in the form of a pair connected in one sentence by an and/thus type conjunction, co-occurring in a virtual corpus on the Internet 40, are collected from the Internet 40.

Thereafter, on every phrase pair collected in this manner, the following process 574 is executed (step 572). Specifically, in process 574, whether the relation between the noun pair in the phrase pair under processing is positive or not is determined. If the determination is positive, whether the excitatory/inhibitory class of the template pair is the same or opposite is determined (step 592). If the determination at step 592 is in the negative, the noun pair is discarded. If the determination at step 592 is in the positive, the phrase pair is added to a group of causality pairs (step 594).

On the other hand, if the determination at step 590 is in the negative, whether the excitatory/inhibitory class of the template pair is opposite is determined at step 596. If the determination is in the negative, the phrase pair is discarded. If the determination is in the positive, the phrase pair is added to the group of causality pairs.

When the process described above is completed for all phrase pairs, for all causality phrase pairs in the resulting group of causality pairs, the process of step 578 is executed (step 576). The process executed on each causality phrase pair at step 578 is the process of calculating the causality strength score $Cs(p_1, p_2)$, in accordance with the equation below.

$$C_s(p_1,p_2)=|s_1|\times|s_2|\times n p\text{freq}(n_1,n_2) \quad (4)$$

where $p_1$, $p_2$ represent phrases constituting the causal pair, $s_1$ and $s_2$ represent excitation values of templates forming phrases $p_1$ and $p_2$, respectively, $|s_1|$ represents absolute value of excitation value $s_1$, $n_1$ and $n_2$ represent nouns included in phrases $p_1$ and $p_2$, respectively, npfreq($n_1$, $n_2$) represents frequency of co-occurrence of $n_1$ and $n_2$ in one sentence with the template pair of the same excitatory/inhibitory class if $n_1$ and $n_2$ have the positive relation, and frequency of co-occurrence of $n_1$ and $n_2$ in one sentence with the template pair of the different excitatory/inhibitory class if $n_1$ and $n_2$ have the negative relation.

After the score of causality strength is calculated for every causality phrase pair in this manner, at step 580, the causality phrase pairs are sorted and output, in the descending order of scores.

By executing such a process, a huge number of phrase pairs representing causality can automatically be collected from the Internet 40.

The method of acquiring causality is not limited to the above. By way of example, the phrase pairs satisfying all the following conditions may be acquired as causality phrase pairs.

(1) Each of the two phrases consists of one noun and one excitatory/inhibitory phrase. Example: phrase pair such as "(jishin wo) okosu (cause earthquake)" and "(tsunami ga) hassei suru (tsunami hits)".

(2) Both phrases co-occur in one sentence, coupled by an and/thus type conjunction, such as " . . . te (and)". Example: phrase pair such as "danso ga jishin wo okoshi te tsunami ga hassei shita (a fault caused an earthquake, and tusnamis hit)".

Specifically, from the Internet 40, template pairs co-occurring in one sentence with an and/thus type conjunction and noun pair co-occurring in the one sentence are acquired. These are considered to be a prototype of causality pair.

For the causality phrase pair obtained in this manner, the causality strength score is calculated in accordance with, for example, Equation (5) below. Then, all the causality phrase pairs are sorted and output in descending order of the causality strength scores.

$$C_s(p_1, p_2) = |s_1| \times |s_2| \qquad (5)$$

In calculating the scores in the second embodiment above, Equation (5) may be used in place of Equation (4).

Third Embodiment

In the second embodiment, from the documents on the Internet 40, causalities considered to describe causal relations are extracted. In the real world, however, there are numerous relations that can be considered causal. In the second embodiment, of the numerous such relations, only those described on the Internet 40, that is, those supported by the expression activities of humans are extracted. It is noted, however, that causality can be expressed in various different manners. For example, causal relation around "beikokusan gyuniku wo nyushu sura (get US beef)→gyudon wo tsukuru (prepare beef-over-rice bowl)" may be expressed in various manners, even when limited to Japanese.

TABLE 15

| Cause | Result |
| --- | --- |
| beikokusan gyuniku wo nyushu suru (get US beef) | -> gyudon wo tsukuru (prepare beef-over-rice bowl) |
| beikokusan gyuniku wo kounyu suru (buy US beef) | -> gyudon wo hanbai suru (sell beef-over-rice bowl) |
| beikokusan gyuniku wo yunyu suru (import US beef) | -> gyudon ga taberareru (can eat beef-over-rice bowl) |
| beikokusan gyuniku ga yunyu kinshi sareru (import of US beef banned) | -> gyudon ga taberare nai (cannot eat beef-over-rice bowl) |

It would be convenient if causal expressions such as above, which may actually exist but not explicitly appearing on the Internet 40, can be generated from expressions at hand. Then, coverage over numerous causalities expressed in various and many ways can be widened and accuracy in language processing and inference using natural language can be improved.

Using template DB 62 described with reference to the first embodiment, phrase pairs, actual existence of which cannot be confirmed on the Internet 40 but which can be considered relevant, can be generated as hypotheses of causality. In the following, an embodiment realizing such a function will be described.

Figure 12:
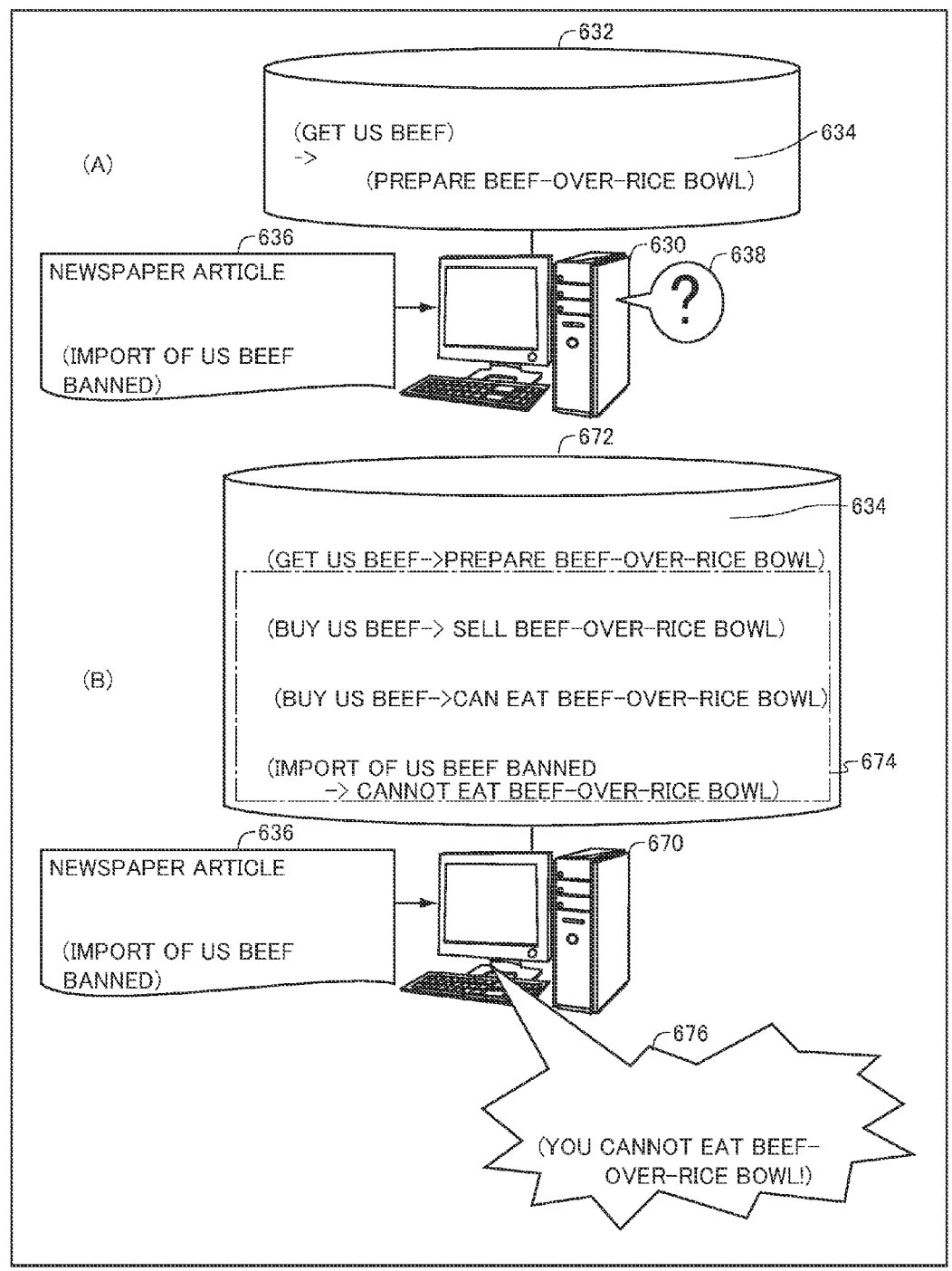
FIG. 12 is a schematic diagram showing an example in which conclusion of an inference system differs depending on contents of causality data base.

Referring to FIG. 12(A), assume that there is a database (causality DB 632) describing causality, and an inference system 630 is set to output a hypothesis that can be inferred from an input, using the causality DB 632. Assume that the causality relation "beikokusan gyuniku wo nyushu sura (get US beef)→gyudon wo tsukuru (prepare beef-over-rice bowl)" 634 is contained in causality DB 632, and that this is the only causality contained in causality DB 632 that is related to US beef.

In this situation, consider that an article 636 "beikokusan gyuniku yunyu kinshi (import of US beef banned)" appear in a newspaper, and a question as to what kind of influence it causes is input to inference system 630. The causality available to inference system 630 is only the causality 634. There is no description related to the causality between US beef and import ban in inference system 630. Therefore, inference system 630 will not provide any output 638.

On the other hand, referring to FIG. 12(B), consider another causality DB 672 related to US beef. Causality DB 672 includes not only the causality 634 but also other group of causalities 674 shown in Table 15. Assume that an inference system 670 infers an answer to a question, using causality DB 672. If the same question as in the case of FIG. 12(A) is input, inference system 670 can provide an output 676 "gyudon ga taberare naku narimasuyo (you cannot eat beef-over-rice bowl)" from the causality "beikokusan gyuniku ga yunyu kinshi sareru (import of US beef banned)→gyudon ga taberare nai (cannot eat beef-over-rice bowl)" in causality DB 672. It is apparent that such a system is far more useful than inference system 630 shown in FIG. 12(A).

The problem is how to obtain the group of causalities 674 etc. if only the causality 634 is available on the Internet 40. Here, use of template DB 62 described with reference to the first embodiment will be helpful.

The system for outputting causality hypotheses not directly found on the Internet 40 from a causality that can be found on the Internet 40 using template DB 62 can be implemented by computer hardware and a program executed by the computer hardware. The system is used together with template DB 62 shown in FIG. 1.

Figure 13:
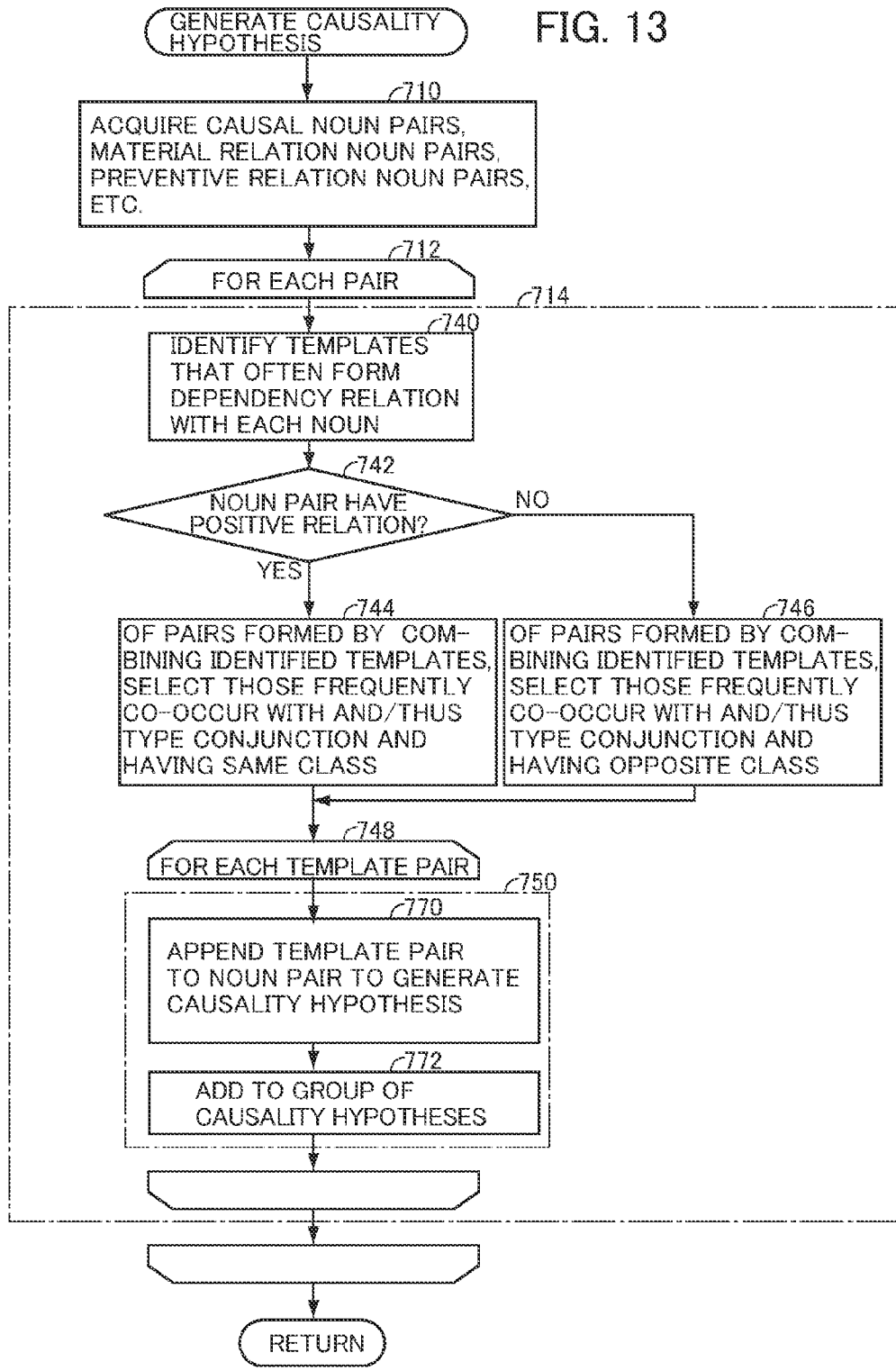
FIG. 13 is a flowchart representing a control structure of a program realizing a function of generating a causality hypothesis from various noun pairs in accordance with the third embodiment of the present invention.

Referring to FIG. 13, the program for realizing such a function in accordance with the present embodiment includes a step 710 of acquiring noun pairs each having causality relation (causality noun pair), noun pairs each having a relation that one noun represents a material of the other (material relation noun pair), and noun pairs each having a relation that one noun prevents the other (preventive relation noun pair). All these noun pairs can be acquired from expressions matching prescribed patterns, using conventional techniques. By way of example, for finding a causality noun pair, an expression matching such a pattern that "A causes B" is selected, and the nouns A and B are acquired as the causal noun pair. For the material relation noun pair, from an expression matching a pattern such as "form A from B," nouns A and B are acquired. For the preventive relation noun pair, from an expression matching a pattern such as "A prevents B," nouns A and B are acquired. Table 16 shows such examples. The noun pairs acquired at step 710 for generating causality hypotheses are not limited to the three types of noun pairs mentioned above, and various other relations may exist.

TABLE 16

| Type of noun pair | Example | Remarks |
| --- | --- | --- |
| Causal noun pair | (earthquake, tsunami) | The noun pair is deemed to have positive relation |
| Material relation noun pair | (beef, beef-over-rice bowl) | The noun pair is deemed to have positive relation |
| Preventive relation noun pair | (anticancer drug, cancer) | The noun pair is deemed to have negative relation |

The program further includes a step 712 of executing the following program portion 714 on every noun pair acquired at step 710.

The program portion 714 includes: a step 740 of identifying, for each of the nouns in the noun pair under processing, a template that often forms a dependency relation with the noun; a step 742 of determining whether the noun pair has the positive relation and branching the control flow in accordance with the result; a step 744, executed if the determination at step 742 is in the positive, of selecting, from pairs obtained by combining the templates identified at step 740, one whose templates frequently co-occur with the and/thus type conjunction and belong to the same excitatory/inhibitory class with each other; and a step 746, executed if the determination at step 742 is in the negative, of selecting, from pairs obtained by combining the templates identified at step 740, one whose templates frequently co-occur with the "and/thus" type conjunction and belong to the opposite excitatory/inhibitory classes with each other. Here, "frequently" at step 744 and 746 means that the frequency of occurrence on the Internet 40 is higher than a prescribed value.

The program portion 714 further includes a step 748, executed following step 744 or 746, of executing a program portion 750 as will be described in the following, on every template pair selected at step 744 or 746.

The program portion 750 includes: a step 770 of generating a causality hypothesis by attaching the template pair under processing to the noun pair under processing; and a step 772 of adding the causality hypothesis generated at step 770 to the group of causality hypotheses and ending the process.

The program having such a control structure as shown in FIG. 13 executed on a computer connected to the Internet 40 enables acquisition of a huge number of causality hypotheses that are expressions (pairs of noun+template) representing some causality, not existing on the Internet 40.

By way of example, the following situation may be possible. Assume that a material relation noun pair <beef, beef-over-rice bowl> (deemed to have a positive relation) and a preventive relation noun pair <anticancer drug, cancer> (deemed to have a negative relation), and the excitatory/inhibitory templates such as shown in Table 17 are given as a premise.

TABLE 17

| Excitatory template | Inhibitory template |
| --- | --- |
| wo yunyu suru (import something) | wo chiryo suru (treat something) |
| wo shiyou suru (use something) | wo osaeru (prevent something) |
| wo hanbai suru (sell something) | |

By the process of step 740, the following templates are identified.

TABLE 18

| Templates |
| --- |
| gyuniku wo yunyu suru (import beef) |
| gyuniku wo shiyou suru (use beef) |
| gyuniku wo hanbai suru (sell beef) |
| gyudon wo hanbai suru (sell beef-over-rice bowl) |
| kougan zai wo yunyu suru (import anticancer drug) |
| kougan zai wo shiyou suru (use anticancer drug) |

TABLE 18-continued

| Templates |
| --- |
| kougan zai wo hanbai suru (sell anticancer drug) |
| gan wo chiryo suru (treat cancer) |
| . . . |

Further, on these templates, processes of steps 742 to 746 are carried out, whereby template pairs are selected, and on each template pair, the program portion 750 is executed. Consequently, the following causality hypotheses result.

TABLE 19

| Cause | Result |
| --- | --- |
| gyuniku wo yunyu suru (import beef) | -> gyudon wo hanbai suru (sell beef-over-rice bowl) |
| gyuniku wo shiyou suru (use beef) | -> gyudon wo hanbai suru (sell beef-over-rice bowl) |
| kougan zai wo yunyu suru (import anticancer drug) | -> gan wo chiryo suru (treat cancer) |
| kougan zai wo shiyou suru (use anticancer drug) | -> gan wo chiryo suru (treat cancer) |

As described above, by the system in accordance with the present embodiment, using template DB 62, based on the noun pairs collected from the Internet 40, a huge number of causal hypotheses, not existing on the Internet 40, can be generated. As a result, causality hypotheses far larger in number than those obtained from the Internet 40 become available. Thus, wide range of causalities can be covered as a base for an inference system, enabling the inference system to find answers to a wide variety of questions.

Fourth Embodiment

Various other methods of generating causality hypotheses may be possible other than the one described with reference to the third embodiment. According to the fourth embodiment, causality hypotheses are generated using the causality pairs (pairs of phrases having causality relations) directly acquired from the Internet 40, or the causality hypotheses acquired by the method of the third embodiment (one type of causality pairs), and the contradictions (pairs of phrases contradictory to each other) acquired by the first embodiment. Specific procedure is as follows. As a premise of the following process, it is assumed that contradictory phrases "gyuniku wo yunyu suru (import beef)" and "gyuniku ga yunyu kinshi ni naru (import of beef banned)" are acquired in advance, and contradictory phrases "gyudon wo taberu (eat beef-over-rice bowl)" and "gyudon ga taberare nai (cannot eat beef-over-rice bowl)" are acquired in advance.

(1) Causality is selected. By way of example, phrases "gyuniku wo yunyu suru (import beef)→gyudon wo taberu (eat beef-over-rice bowl)" are selected.

(2) For each of the two phrases constituting the causality, each phrase is replaced by a phrase contradictory (having the opposite meaning) to it. For example, "gyuniku wo yunyu suru (import beef)" is replaced by "gyuniku ga yunyu kinshi ni naru (import of beef banned)" and "gyudon wo taberu (eat beef-over-rice bowl)" is replaced by "gyudon ga taberare nai (cannot eat beef-over-rice bowl)".

(3) A new causality hypothesis "gyuniku ga yunyu kinshi ni naru (import of beef banned)→gyudon ga taberare nai (cannot eat beef-over-rice bowl)" results.

Figure 14:
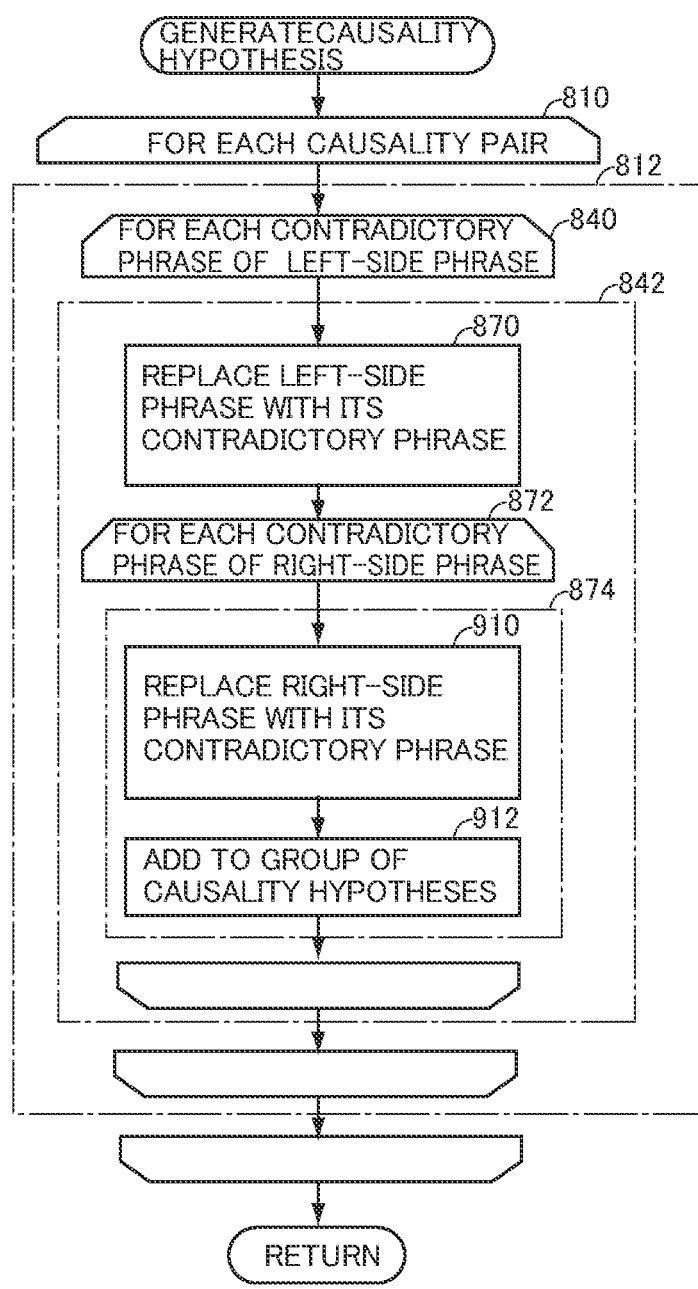
FIG. 14 is a flowchart representing a control structure of a program realizing a function of generating a new causality hypothesis based on causality pair and contradictory pair, in accordance with the third embodiment of the present invention.

Thus, as a result of this process, by replacing each phrase of already acquired causality or causality hypothesis with contradictory phrase, a new causality hypothesis is automatically obtained. Referring to FIG. 14, the program for realizing the present embodiment by computer hardware includes, assuming that causality pairs have already been acquired, a step 810 of executing a program portion 812 as will be described in the following, on each causality pair.

The program portion 812 includes a step 840 of executing the following program portion 842 on every contradictory phrase corresponding to the phrase on the left side (the phrase representing a cause) of the causality pair under processing.

The program portion 842 includes: a step 870 of replacing the phrase on the left side of causality pair that is being processed with a phrase contradictory thereto (a contradictory phrase selected under processing at step 840); and a step 872 of executing the following program portion 874 on every phrase contradictory to the phrase on the right side of the causality pair that is being processed.

The program portion 874 includes: a step 910 of replacing the phrase on the right side of causality pair that is being processed with a phrase contradictory thereto; and a step 912 of adding the new phrase pair newly obtained as a result of step 910 as a new causality hypothesis, to a group of causality hypotheses, and ending the process.

By the program having such a control structure as described above, for every causality pair under processing, by replacing the left-side phrase with a phrase contradictory to the left-side phrase and replacing the right-side phrase with a phrase contradictory to the right-side phrase, a new causality hypothesis can be obtained. If the left-side phrase and/or right-side phrase have a plurality of contradictory pairs, the number of causality hypotheses generated therefrom increases exponentially. Further, this process involves no manual labor. Therefore, causality hypotheses covering a vast range can be generated automatically.

Other Applications

Improving Accuracy of Synonymous/Entailment Expressions

All of the above-described embodiments eventually acquire some type of phrase pairs. The use of template pairs obtained by the present invention, however, is not limited to such embodiments. Various other usages may be possible.

The first such example is to use the templates to improve accuracy when synonymous expressions or entailments are to be acquired. Generally, synonyms and entailments are acquired from texts using similarity of corresponding contexts (distributional similarity) as a clue. Examples are as follows.

TABLE 20

| Type | 1st predicate template | | 2nd predicate template |
|---|---|---|---|
| Synonym | (noun 1) wo yunyu suru: import (noun 1) | = | (noun 2) wo inpoto suru: buy (noun 2) from abroad |
| Entailment | (noun 3) ga yunyu kinnshi ni naru: import of (noun 3) is banned | = | (noun 4) ga nyushu konnan ni naru: (noun 4) becomes unavailable |

Of the examples above, in Synonym, the context of "wo yunyu suru (import something)" is "noun 1" and the context of "wo inpoto suru (buy something from abroad)" is "noun 2." Then, it is often the case that noun 1 and noun 2 are the same or synonyms. The reason for this is that the meanings of these two phrases are similar (synonymous). Similarly, the context of "ga yunyu kinnshi ni naru (import of something banned)" is "noun 3" and the context of "ga nyushu konnan ni naru (something becomes unavailable)" is "noun 4." Then, there is a strong tendency that a set formed by noun 3 constitutes a subset of the set formed by noun 4. Therefore, both the synonyms and entailments involve templates having similar contexts, and distributional similarity becomes high. Synonyms/entailments are acquired using such a relation.

The distributional similarity, however, often represents mutually contradictory (opposite) relations, as well as the relation of synonyms/entailments between two templates. By way of example, "(noun 1) wo yunyu suru:import (noun 1)" and "(noun 2) ga yunyu kinnshi ni naru: import of (noun 2) is banned" are mutually contradictory. It is often the case, however, that the same noun fills the slots of noun 1 and noun 2, and as a result, the distributional similarity becomes high. Therefore, templates having contradictory meanings are often erroneously selected as synonyms or entailments, posing a problem.

Such a problem can be solved by the use of template DB 62. Specifically, for each of language expression pairs as candidates of synonyms/entailments extracted by a conventional method, whether the excitatory/inhibitory class of the templates in the pair match or not is determined. If the templates have the same excitatory/inhibitory class, these templates can be regarded as having the synonym/entailment relation. If their excitatory/inhibitory class does not match, these templates can be regarded as having the contradictory relation.

This determination, however, cannot be applied to language expressions that do not have the attribute of excitatory/inhibitory class, such as nouns.

<<Acquisition of Causality Noun Pair Bridging Sentences>>

Most of the conventional schemes for acquiring causality noun pairs involve extraction of noun pairs co-occurring in one sentence in a certain pattern. Such approach, however, allows acquisition of only the causality pairs that are described in one sentence. On the other hand, in the actual world, there can be expressions of causality other than the expressions co-occurring in one sentence. Particularly, pairs of expressions existing at close positions in texts often represent causality. For example, "Tohoku de jishin ga okita. Sonogo, oozei no hito ga tsunami ni osowareta. (An earthquake occurred in Tohoku. Then, many were hit by tsunamis.)" has such a relation.

Causality noun pairs bridging sentences as described above can be acquired in the following manner, utilizing template DB 62.

First, causalities or causality hypotheses (each in the form of phrase pair+and/thus type conjunction) are prepared by some method. The schemes of the second or third embodiment may be used. Of these, templates that frequently appear are extracted. For example, template pairs such as "ga okiru (something occurs)→ni osowareru (hit by something)" and "wo hikiokosu (cause something)→ga hassho suru (develop something)" may be obtained.

Next, for each of the template pair obtained by the above-described procedure, those that co-occur in adjacent but different two sentences on the Internet 40 are detected. For each detected template pair, a noun pair that co-occurs with the templates is extracted. It is highly likely that the noun pair obtained in this manner is a noun pair having causality relation, since the pair co-occurs with the template pair that originally has the causality relation. It is noted that the noun pair and the corresponding co-occurring template pair do not co-occur in one sentence. Therefore, as compared with the causality noun pair acquired in the conventional manner, causality noun pairs covering wider range can be acquired.

Functions and Effects of the Embodiments

The above-described embodiments of the present invention attain the following effects.

A huge number of phrase pairs and noun pairs having causalities can be acquired no matter whether such pairs are written in text or not. Particularly, it is logically possible that part of these contain new hypotheses not written in text. Specifically, from a virtual corpus on the Internet 40, hypotheses related to new knowledge not described on the Internet 40 can be generated.

Further, by the embodiments above, semantic contradictions in the text can accurately be recognized. As a result, accuracy in recognizing contradictions as well as synonyms and entailments can also be improved.

Because of such effects, it becomes possible not only to search for texts but also to infer based on the contents of a text, or to provide mutually contradictory information or causality relation between such pieces of information to the user. As a result, means for verifying reliability of information and means for predicting possible outcome can be provided.

Most promising practical application of the present invention is to a question-answering system that returns a wise, straight-forward and accurate answer to a question written in a given language. When combined with speech recognition technology, the present invention will be highly compatible with a system that receives a question through a computer and returns an answer, or a system maintaining a database storing past events, for example, at a call center.

By the system utilizing the embodiments such as described above, a causality database covering a vast range can be prepared. With such a database, it becomes possible to provide an apt answer to a question related to causality, that is, a "why-question", which is a weakness of conventional question-answering systems. By way of example, assume a question "why the price of cemented carbide tools is increasing?" To give an answer such as "it is because China banned export of tungsten" has been conventionally difficult. Using the causality database attained by the embodiments above, however, such an answer can readily be provided.

Further, by the hypotheses generating technique described above, it becomes possible to present even a piece of information not found on the Internet 40 as a hypothesis. Conventional question-answering systems cannot provide any answer concerning an outcome or cause of an unknown event. The embodiments described above enables such a technique. Assume, for example, that before the price of cemented carbide tools actually increase, a question "what is a possible cause of increase in the price of cemented carbide tools" is input. Using the technique of the embodiments above, it is possible to provide, as an answer, a hypothesis that "the price of cemented carbide tools possibly increases if China bans export of tungsten." Such a possibility allows a user to hedge a risk. Further, to questions concerning virtual situations not described in existing texts such as "if China were to ban export of tungsten, what is the cause?" or "if the price of cemented carbide tools should increase, stock price of which companies could dip?" the system can automatically generate apt answers. Further, even before receiving such a question, it would be possible to find and present such conditions and their outcome beforehand. In other words, the system comes to have an ability to list virtual future scenarios. This serves as a powerful tool in decision making in the field of business, politics, economy and technology. If implemented, such a system will be an unrivaled, sophisticated information service technique having immense value in business.

Another example is a claim made by a client of a product, in connection with a trouble contradictory to past events, received by a call center. Typically, at a call center, information is searched for in a database using a keyword or keywords, and an appropriate answer is found. If a trouble contradicts to past events, however, any appropriate information would not be found by the search. Therefore, the conventional approach has been useless to address such a trouble. Using the technique of automatically recognizing contradiction in accordance with the above-described embodiment, however, at least it becomes possible for the system to recognize that the new claim is contradictory to past events and to present such recognition to the operator. Such results help the operator to cope with the problem far better than when no such information was available. For instance, as the new claims contradict to past events, the operator may suggest that the client misidentifies the trouble, or that the trouble is unknown. Such a course of action would lead to problem solving smoother than conventional ones.

In the embodiments above, causalities can automatically be recognized without using clue expressions such as "tame" (since) or "node" (hence). Pieces of information corresponding to a dictionary can also be automatically acquired. Therefore, application thereof can dramatically be widened.

Further, in the embodiments above, the verbs are classified to three classes. i.e., excitatory/inhibitory/neutral. Such classification has never been conceived before. Of these, no corresponding classification has been proposed for inhibitory predicates. In the recognition of contradiction or causality, the combination of excitatory/inhibitory class of predicates (templates) is a critical factor, and both are indispensable for effective use. The prior art lacking such excitatory/inhibitory classification or excitatory/inhibitory/neutral classification cannot attain the effects of the embodiments described above in automatic recognition of causalities and contradictions.

Further, the embodiments above enables acquisition of more than the causality between nouns such as the causality between "cholesterol" and "cerebral infarction" as handled by the prior art. Specifically, phrase-based hypothesis such as 'take cholesterol' is a cause of 'suffer from cerebral infarction' can also be generated. Regarding semantic relation between words, the embodiments above enables acquisition of relations that could not be attained by the prior art. Thus, the embodiments above enhances the technique of generating hypotheses related to semantic relations between words over the prior art.

Further, in recognizing synonyms/entailments, in the embodiments above, verbs such as "cause" and "prevent" are classified in advance to have different labels (excitatory/inhibitory). Further, a constraint is posed that verbs classified to have different labels are not recognized as synonyms. By such a constraint, erroneous recognition of an antonym having high distributional similarity as a synonym or entailment can be avoided. Thus, the embodiments above improve accuracy in recognizing synonyms/entailments.

[Computer Implementation]

Figure 15:
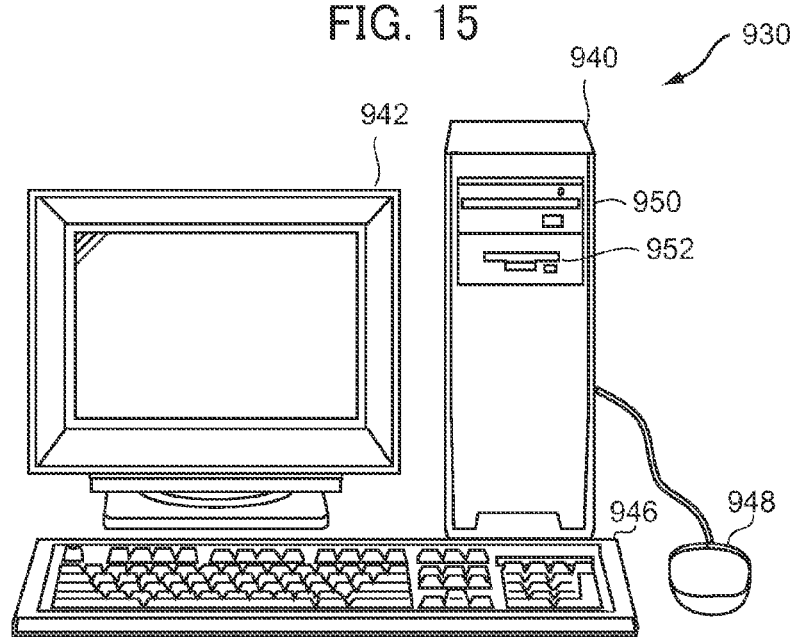
FIG. 15 shows an appearance of a computer for realizing the question-answering system in accordance with an embodiment of the present invention.

The system in accordance with the embodiments above can be implemented by computer hardware and computer programs executed on the computer hardware. FIG. 15 shows an appearance of computer system 930 and FIG. 16 shows an internal configuration of computer system 930.

Referring to FIG. 15, computer system 930 includes a computer 940 having a memory port 952 and a DVD (Digital Versatile Disk) drive 950, a keyboard 946, a mouse 948, and a monitor 942.

Figure 16:
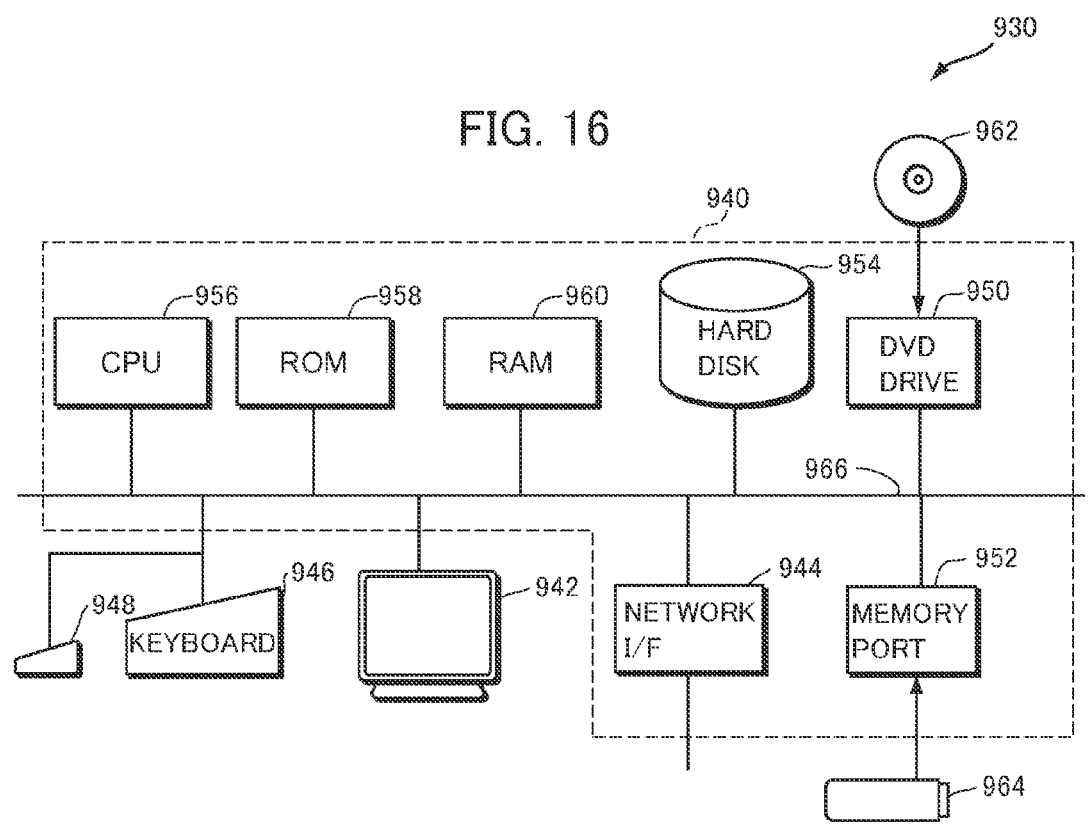
FIG. 16 is a block diagram showing hardware configuration of the computer shown in FIG. 15.

Referring to FIG. 16, computer 940 includes, in addition to memory port 952 and DVD drive 950, a CPU (Central Processing Unit) 956, a bus 966 connected to CPU 956, memory port 952 and DVD drive 950, a read only memory (ROM) 958 storing a boot-up program and the like, and a random access memory (RAM) 960 connected to bus 966, storing program instructions, a system program and work data. Computer system 930 further includes a network interface (I/F) 944 providing the computer 940 with the connection to a network allowing communication with another terminal.

The computer program causing computer system 930 to function as each of the functioning sections of the system in accordance with each of the embodiments above is stored in a DVD 962 or a removable memory 964 loaded to DVD drive 950 or to memory port 952, and transferred to hard disk 954. Alternatively, the program may be transmitted to computer 940 through a network, not shown, to computer 940 and stored in hard disk 954. At the time of execution, the program is loaded to RAM 960. The program may be directly loaded from DVD 962, removable memory 964 or through network to RAM 960.

The program includes a plurality of instructions to cause computer 940 to operate as functioning sections of the system in accordance with each of the embodiments above. Some of the basic functions necessary to realize the operation are provided by the operating system (OS) running on computer 940, by a third party program, or by a module of various programming tool kits installed in computer 940. Therefore, the program may not necessarily include all of the functions necessary to realize the system and method of the present embodiment. The program has only to include instructions to realize the functions of the above-described system by calling appropriate functions or appropriate program tools in a program tool kit in a manner controlled to attain desired results. The operation of computer system 930 is well known and, therefore, description thereof will not be given here.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is usable with methods and apparatuses utilizing natural language processing and, more specifically, it is usable in the field of industry manufacturing, using or leasing a predicate template collector and the like that can efficiently, automatically and highly accurately recognize predicate templates forming phrases and phrase pairs having specific relations.

REFERENCE SIGNS LIST 30 contradiction collecting system
32 seed template storage
34 conjunction storage
36 contradiction collector
38 contradiction storage
40 Internet
60 template DB builder
62 template DB
64 contradiction acquiring section
90 template pair generator
92 template pair storage
94 noun pair collector
96 noun pair storage
98 noun pair polarity determiner
100 template pair collector
102 template pair storage
104 template excitation match determiner
106 template network builder
108 synonym/entailment dictionary
110 template network storage
112 template excitation value calculator 114 high excitation value template extractor
116 end determiner
118 seed template updater
140 template network
630, 670 inference system
632, 672 causality DB
634 causality
674 group of causalities

The invention claimed is:
1. A computer-implemented hypotheses generating device for generating causal hypotheses from a prescribed corpus of text located on the Internet and outputting a causality hypothesis associated with an inputted query in order to improve understanding of natural language in artificial intelligence by recognizing a relation between sentences or phrases of natural language, wherein:
 each predicate template is coupled to a noun to form a phrase;
 an excitation value indicative of orientation and magnitude of excitation is assigned to each predicate template in accordance with a classification of excitatory, inhibitory and neutral;
 excitatory indicates a description of an event in an orientation to stimulate a function or effect of an object indicated by a noun coupled to an associated predicate template,
 inhibitory indicates a description of an event in an orientation not to stimulate a function or effect of an object indicated by a noun coupled to the associated predicate template;
 neutral indicates that the associated predicate template is neither an excitatory nor inhibitory predicate template;
 excitatory and inhibitory nature of the associated predicate template is referred to as a polarity; and
 said hypotheses generating device includes:
  a network interface connected to the Internet;
  a non-transitory computer readable medium configured to store the generated hypotheses, the non-transitory computer readable medium comprising:
   a conjunction storage configured to store conjunctions classified to and/thus type or but type conjunctions; and
  a processor configured to:
   perform expression matching to collect, from the prescribed corpus of natural language accessed via the Internet, noun pairs satisfying a certain relation between a first noun and a second noun forming the noun pair, wherein the certain relation comprises at least one of:
a causality relation where the first noun causes the second noun;
a material relation noun pair where the first noun is a material of the second noun; or
a preventive relation where the first noun prevents the second noun;
classify a polarity of relation between nouns forming each noun pair to positive or negative, such that the polarity of relation between nouns forming each noun pair is:
defined as positive if an object represented by one of the pair of nouns promotes occurrence of an object represented by the other, and
defined as negative if the object represented by the one of the pair of nouns prevents the occurrence of the object represented by the other;
for each of the collected noun pairs:
collect first predicate templates that form a dependency with the first noun of the noun pair in the prescribed corpus of natural language;
collect second predicate templates that form a dependency with the second noun of the noun pair in the prescribed corpus of natural language;
combining the first predicate templates and the second predicate templates to form predicate template pairs;
determine, for each of the predicate template pairs, whether both templates of a given predicate template pair belong to the same excitatory/inhibitory class or to the opposite excitatory/inhibitory class, based on the polarity of relation of the noun pair co-occurring with the predicate template pair and the conjunction coupling the predicate template pair;
when the relation between the noun pair is classified as positive, selecting from the predicate template pairs at least one predicate template pair, wherein:
each of the selected at least one predicate template pair frequently co-occur in the prescribed corpus of natural language with conjunctions that are classified in the conjunction storage as and/thus type conjunctions, wherein frequently co-occurring refers to the frequency of occurrence in the prescribed corpus of natural language being greater than a prescribed value; and
the first predicate template and the second predicate template of each of the selected at least one predicate template pair belong to the same excitatory/inhibitory class;
when the relation between the noun pair is classified as negative, selecting from the predicate template pairs at least one predicate template pair, wherein:
each of the selected at least one predicate template pair frequently co-occur in the prescribed corpus of natural language with conjunctions that are classified in the conjunction storage as and/thus type conjunctions; and
the first predicate template and the second predicate template of each of the selected at least one predicate template pair belong to the opposite excitatory/inhibitory class;
for each of the selected at least one predicate template pair:
generating a causality hypothesis by attaching the template pair to the noun pair;
storing the causality hypothesis in the non-transitory computer readable medium;
upon receiving an input query, retrieve stored causality hypotheses including a noun of said input query;
determine, for each of said retrieved causality hypotheses, the polarities of the first predicate template, the second predicate template, the first noun, and the second noun forming the causality hypothesis;
determine whether each of said causality hypotheses is relevant to the input query based on the polarities of said first and second predicate templates and of said first and the second nouns; and
output the causality hypothesis determined to be relevant in order to improve machine based estimate of consequences of the inputted query by the computer-implemented hypotheses generating device.

2. The computer-implemented hypotheses generating device according to claim 1, the processor further configured to
determine, for each of the combinations of the collected noun pairs, based on the polarity of predicate template pair co-occurring with each noun pair and the type of conjunction coupling a phrase pair formed by the noun pair and the predicate templates, the polarity of relation between the nouns forming the combination of the noun pair.

3. The computer-implemented hypotheses generating device according to claim 2, the processor further configured to:
determine, for each of the noun pairs collected, based on the polarity of predicate template pair of the predicate templates co-occurring with the noun pair and the type of conjunction coupling a phrase pair formed by the noun pair and the predicate templates, the polarity of relation between the nouns forming each of the noun pairs; and
collect, type by type of said noun pairs, polarities determined for each of said noun pairs, and determining polarity for each type of noun pairs, by the majority.

4. The computer-implemented hypotheses generating device of claim 1, wherein
the processor is further configured to:
collect, from a prescribed corpus, phrase pairs each including a predicate template pair comprised of a combination of specific excitatory/inhibitory predicate templates among said predicate templates stored in said predicate template storage means and a specific type of conjunction; and
select a phrase pair representing a prescribed relation, by extracting, from the phrase pairs collected, a phrase pair of which noun pair co-occurring with a predicate template pair and the polarity of predicate template pair in said phrase pair have a specific combination.

5. The computer-implemented hypotheses generating device according to claim 4, the processor further configured to:
calculate, for each of the phrase pairs selected, a score representing strength of said prescribed relation as a function of the excitation value of said predicate templates forming each said phrase pair and co-occurrence relation in said corpus of the noun pair included in said phrase pair; and rank the phrase pairs selected in accordance with the scores calculated.

* * * * *